United States Patent
Frankenbery et al.

(10) Patent No.: US 6,669,486 B2
(45) Date of Patent: Dec. 30, 2003

(54) METHOD OF INSTRUCTION

(75) Inventors: Matthew B. Frankenbery, Pittsburg, KS (US); Larry D. Dunekack, Pittsburg, KS (US); Clarence M. Anderson, Frontenac, KS (US); Martha A. Sours, Pittsburg, KS (US); Kelly J. Reddin, Joplin, MO (US)

(73) Assignee: Pitsco, Inc., Pittsburg, KS (US)

( * ) Notice: Subject to any disclaimer, the term of this patent is extended or adjusted under 35 U.S.C. 154(b) by 18 days.

(21) Appl. No.: 10/039,683

(22) Filed: Dec. 31, 2001

(65) Prior Publication Data

US 2003/0124500 A1 Jul. 3, 2003

(51) Int. Cl.[7] ............................................... G09B 25/00
(52) U.S. Cl. .......................... 434/404; 434/317; 434/428
(58) Field of Search ............................... 434/308, 311, 434/317, 238, 237, 236, 404, 428, 430, 403

(56) References Cited

U.S. PATENT DOCUMENTS

| | | | | |
|---|---|---|---|---|
| 4,637,799 A | * | 1/1987 | Bouchal | 434/236 |
| 5,741,137 A | * | 4/1998 | Aduvala | 434/236 |
| 5,910,009 A | * | 6/1999 | Leff et al. | 434/322 |
| 5,957,698 A | | 9/1999 | Dean et al. | |
| 6,056,549 A | * | 5/2000 | Fletcher | 434/112 |
| 6,148,173 A | * | 11/2000 | Bell | 434/309 |

* cited by examiner

Primary Examiner—Kien T. Nguyen
(74) Attorney, Agent, or Firm—Hovey Williams LLP

(57) ABSTRACT

An educational system is disclosed for educating learners by having them perform self-directed activities. The preferred system includes a set of distinct pictorial symbols and a training program that trains the learners to associate each of the pictorial symbols with a specific instruction. The system further includes a plurality of activity sheets that each have instructional indicia comprising a plurality of the pictorial symbols arranged to instruct the learners to perform one of the activities. The activity sheets are arranged in sets so that the learners perform a series of activities related in educational content when presented with each set. An educational method is also disclosed. The preferred educational method involves training the learners to associate each of the pictorial symbols with the corresponding instruction, using a plurality of the symbols to instruct the learners to perform the desired educational activity, and having the learners perform the that activity.

28 Claims, 9 Drawing Sheets

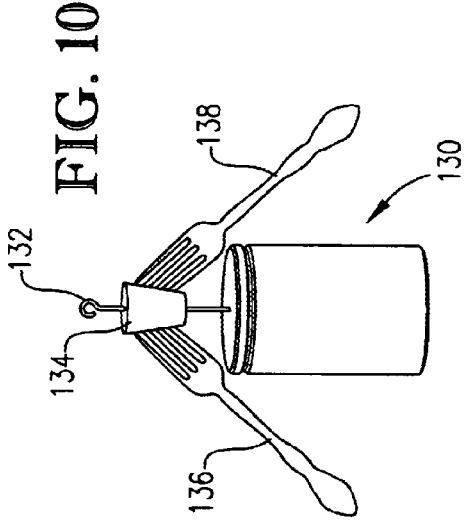
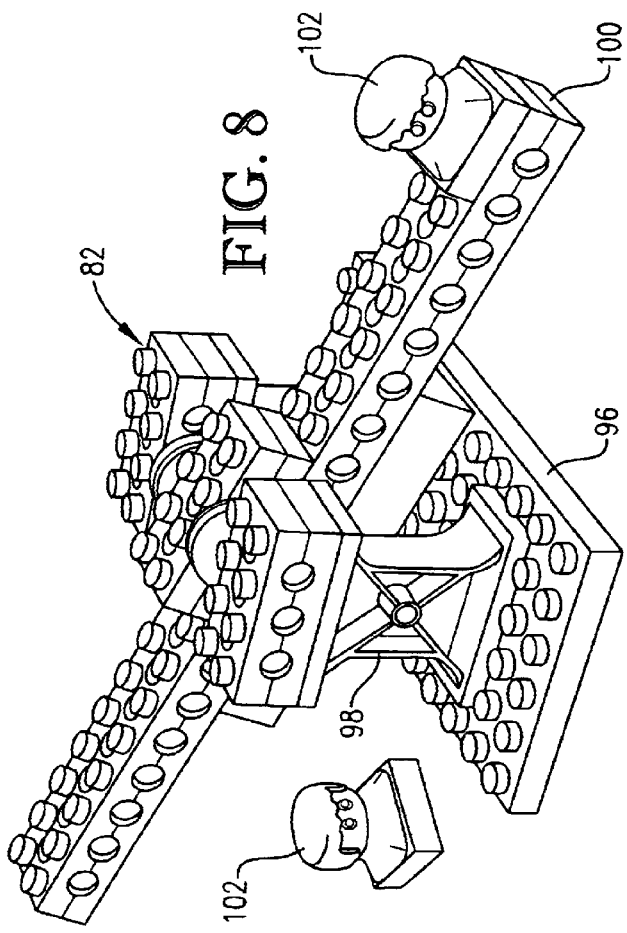
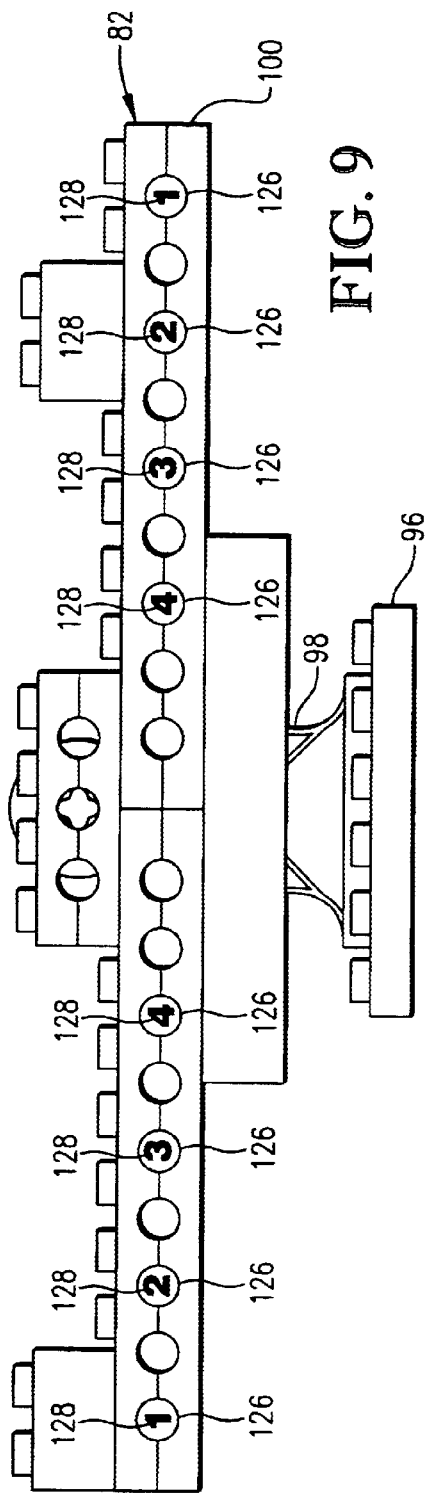

METHOD OF INSTRUCTION

BACKGROUND OF THE INVENTION

1. Field of the Invention

The present invention relates generally to an educational system. More specifically, the present invention concerns an activity based, self-directed educational system and method of educating, wherein the learner is instructed with graphic, non-textual instructions to perform an educational activity.

2. Discussion of Prior Art

Various teaching techniques have been developed and utilized to educate people. One educational style involves having a learner perform or participate in a self-directed educational activity, in which the learner is provided with instructions about the activity and then conducts and controls the performance of the activity according to those instructions. Such an educational system has various well-recognized benefits. For example, it is believed that direct involvement by the learner in performing the educational activity requires relatively greater concentration and attention by the learner, which means the learner is more likely to receive the desired information. It is also believed that the learner is more likely to retain knowledge when it is experienced firsthand. There is also some belief that relatively more knowledge is gained about a principle by creating a trial and error environment, wherein the learner is given the opportunity to fail while conducting the activity and learn from such failures. Yet another advantage of self-directed activity-based educational techniques is that the learner is more likely to extrapolate what is learned in meaningful ways.

However, self-directed activity-based study becomes problematic with people who are alliterate or have difficulty reading (e.g., early primary education students). Those ordinarily skilled in the art will particularly appreciate that instructing reading-challenged learners how to perform the activity is extremely troublesome. With traditional instructional techniques, the reading-challenged learner is first given instructions regarding the activity (e.g., the instructor reads instructions to the learner), and then the learner is required to perform the activity from memory. Because some reading-challenged learners (particularly younger students) have difficulty remembering the instructions, significant instructor participation is required. As previously indicated, instructor involvement in performance of the activity is sometimes undesirable and can adversely impact the learning experience. Such interruptions in the activity can also be detrimental to its educational value. It is also noted that the complexity and length of the activity are both likely restricted when instructing reading-challenged learners.

OBJECTS AND SUMMARY OF THE INVENTION

In accordance with the desired objects of the present invention, which are evident herein, the present invention concerns an educational method for educating a learner without requiring the learner to read textual instructions. The educational method involves the steps of training the learner to associate each of a plurality of distinct pictorial symbols with a specific instruction. Once the learner has been trained, a multiplicity of the pictorial symbols are used to instruct the learner to perform an educational activity. The educational method further includes the step of having the learner perform the educational activity.

Another aspect of the present invention involves a self-directed, activity based educational system for providing education to a learner without requiring the learner to read textual instructions. The system includes a plurality of distinct pictorial symbols and a training program adapted to train the learner to associate each of the plurality of distinct pictorial symbols with a specific instruction. The system also includes a plurality of activity sheets that are each associated with a corresponding one of a plurality of distinct educational activities. Each of the activity sheets include instructional indicia that comprises a multiplicity of the pictorial symbols arranged to instruct the learner to perform the corresponding educational activity.

The inventive educational method and system provide an opportunity for a learner to participate in a highly effective educational activity without having to read instructions. Moreover, the present invention provides self-directed participation and performance of educational activities by the learner(s). This enhances the educational value and minimizes the involvement by an instructor.

Other aspects and advantages of the present invention will be apparent from the following detailed description of the preferred embodiments and the accompanying drawing figures.

BRIEF DESCRIPTION OF THE DRAWING FIGURES

A preferred embodiment of the invention is described in detail below with reference to the attached drawing figures, wherein:

FIG. 8 is a perspective view of the educational model constructed by the learner(s) during the Primary Levers set of educational activities;

FIG. 9 is a side elevation view of the educational model, particularly illustrating use of the model during an educational game played by the learners; and FIG. 10 is a side elevation view of an educational model constructed and used by the learner outside the classroom setting.

DETAILED DESCRIPTION OF THE PREFERRED EMBODIMENT

Figure 1A:
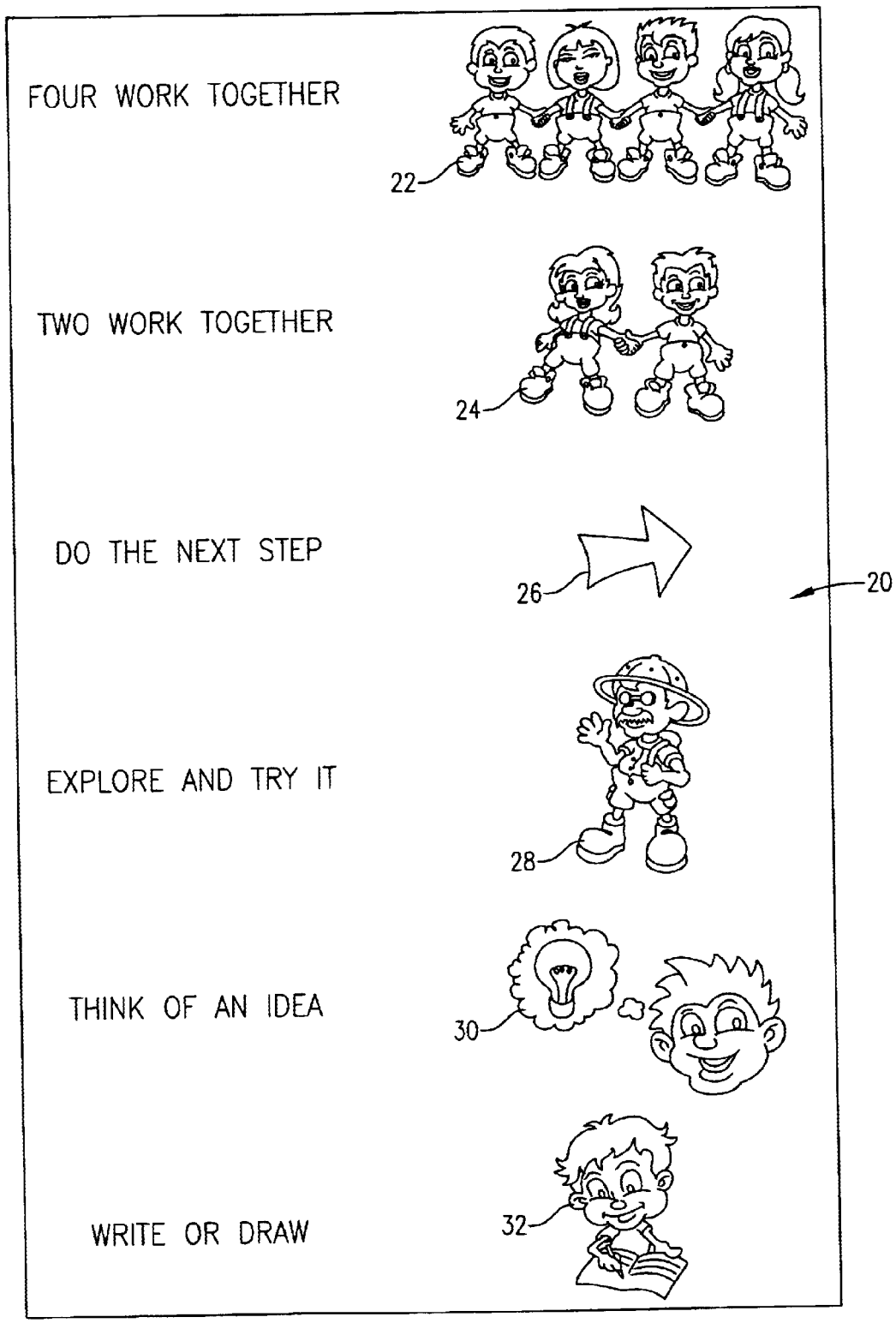
FIG. 1A is a table of pictorial symbols and the corresponding instructions, with each instruction representing what a learner is trained to perform when presented with the respective pictorial symbol, in accordance with a preferred embodiment of the inventive educational system.

The educational system selected for illustration involves a number of educational activities that are each performed by the learner(s) according to instructions given in strictly pictorial form. More particularly, the illustrated system involves training each learner to associate each of a multiplicity of pictorial symbols 20 (see FIGS. 1A and 1B) with a specific, distinct instruction and then instructing the learner(s) to perform the desired educational activity by providing the learner(s) with a plurality of the symbols. The inventive educational system consequently has no literacy prerequisite for learner(s) to participate in performing the educational activities. Moreover, a number of the instructional symbols may be provided to the learner(s), thereby eliminating the need for memorizing the teacher instructions and facilitating self-directed study.

In the illustrated embodiment, the activities are arranged into twelve sets, although the principles of the present invention are equally applicable to any number of activities (including a single educational activity) or sets of activities. The activities of each preferred set are related in educational content and are to be performed in seriatim so that the activities are progressive and expand upon any previous activities. The sets can also be related and arranged in a specific order; however, the preferred system permits the learner to perform the activity sets in any order without having knowledge of any other activity set. Such a configuration permits multiple groups of students to simultaneously perform different activity sets and is therefore particularly useful in a classroom setting.

The twelve activity sets preferably focus on different educational subject matters. Most preferably, the twelve activity sets focus on math, science and technology. The titles of the preferred activity sets are as follows: Color and Light, Community, Construction, Farm, Five Senses, Magnets, Primary Gears, Primary Levers, Primary Wheels and Axles, Seeds, Sink or Float, and Toolbox Creations. Each of the sets of activities is described below, with the activity set entitled Primary Levers being selected as an exemplary set of activities and described in detail. In the preferred embodiment, each activity set consists of four educational activities that are performed serially on different days. Furthermore, each activity set is preferably assigned to four learners, and the four learners perform each of the activities all together or in groups of two. However, it is entirely within the ambit of the present invention to utilize any number of activities in each set, to vary the number of activities from set to set, and to have any number of learners perform each educational activity (e.g., it may desirable in some instances to have some activities performed by a single learner or the entire class of learners).

In the illustrated embodiment, there are essentially twelve pictorial symbols 20 (or slight variations thereof) that the learners are trained to associate with respective instructions and then are used in instructing the learners to perform the various educational activities. Those ordinarily skilled in the art will appreciate that the illustrated symbols 20 are simply illustrative, exemplary, and by no means exhaustive in scope or exclusive. Learners with relatively greater memory skills will be capable of learning significantly more pictorial symbols than those illustrated. It is noted that the illustrated educational system is designed for use with children in kindergarten and first and second grades. The principles of the present invention are, however, applicable to other learners (e.g., alliterate adults).

Each of the symbols 20 preferably represents a distinct step to be performed in completing any one of the educational activities. As will be appreciated, a plurality of the symbols 20 are arranged to instruct the learners to complete the corresponding number of steps and thereby perform the desired educational activity.

The learners must be trained to associate each of the symbols 20 with the respective step to be performed when presented with the corresponding symbol. Such training can occur in any suitable manner, but it is important that the training not require reading by the leaners and that the instructor ensure proper association of each symbol with the corresponding instruction. One suitable technique is a somewhat Socratic teaching method, wherein the learners are shown one of the pictorial symbols 20 and asked to identify what step they believe the symbol represents. The questioning by the instructor and answering by the learners continues until the symbol and step are properly associated. It may also be desirable, once the proper association has been made, to actually perform the activity for the learners (or have the learners perform the activity). This technique is repeated for each of the symbols 20. An alternative technique involves presenting the learners with a prerecorded audio-visual program (e.g., a program recorded on a VHS tape) that shows and explains the step to be performed in connection with each of the symbols 20. In either case, the learners are also given opportunities to practice the pictorial vocabulary, usually with some involvement by the instructor. For example, a set of the symbols 20 used in instructing the learners to perform one of the educational activities can be presented to the learners, and the learners then participate in participating the activity according to the instructions provided by the set of symbols.

Figure 1B:
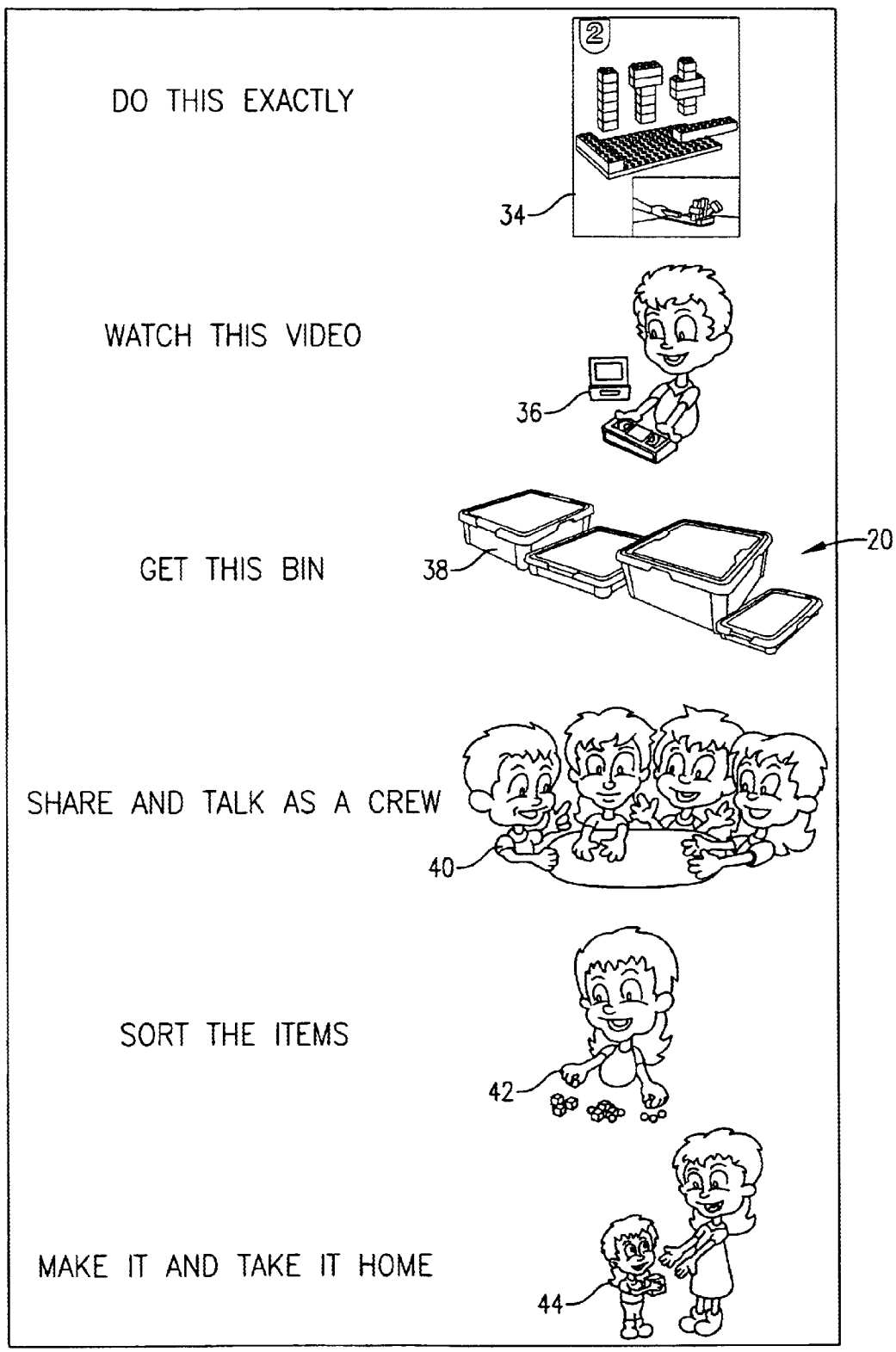
FIG. 1B is a table of additional pictorial symbols and the corresponding instructions used in the preferred embodiment of the present invention.

The symbols 20 of the illustrated embodiment are depicted in FIGS. 1A and 1B in table form, and each symbol illustrated in FIGS. 1A and 1B is accompanied by a brief statement of the step to be completed by the learners when presented with that symbol. The symbols 20 and the steps associated with each will now be described.

Turning first to FIG. 1A, the symbol 22 comprises an image of four children holding hands. The symbol 22 represents the step of grouping together in groups of four learners to perform the educational activity together as a group. As an example, training the learners to complete the step associated with the symbol 22 may involve asking the learners what is depicted (i.e., a group of four children) and noting that the depicted children are holding hands to emphasize that they will work together. The symbol 22 will be referred to herein as the crew symbol 22.

The symbol 24 comprises an image of two children holding hands. Similar to the crew symbol 22, the step represented by the symbol 24 consists of grouping into groups of two learners to perform the activity together as a two-person group. The symbol 24 will be referred to herein as the team symbol 24.

The symbol 26 comprises an image of an arrow. The symbol 26 is used to represent the sequential arrangement of the symbols presented to the learners in connection with an educational activity. The symbol 26 also instructs the learners to proceed to the next symbol once the step associated with the preceding symbol as been completed. The symbol 26 will be referred to herein as the arrow symbol 26.

The symbol 28 comprises an image of a male adult in what is recognizable as an explorer outfit (note, the outfit includes a hard safari hat, a backpack, etc.). The step associated with the symbol 28 involves exploration by learners using the materials provided them in connection with the activity. That is to say, learners are provided with materials to be used during that and/or a subsequent educational activity and, when presented with the symbol 28, the learners are instructed to familiarize themselves with the materials and use the materials to create whatever they wish. The symbol 28 will be referred to herein as the exploration symbol 28.

The symbol 30 comprises the image of a child's face and a caption containing a light bulb. When presented with the symbol 30, the learners are trained to generally expand upon what had been completed so far during the educational activity. The instruction provided by the symbol 30 varies to some degree upon the circumstances in which it is used. For example, the symbol 30 will represent in some instances the step of thinking of a solution to a problem presented during the educational activity. The symbol 30 may alternatively instruct the learners to think of ideas to implement based on any previous steps performed. The symbol 30 will be referred to herein as the idea symbol 30.

The symbol 32 comprises an image of a child writing on a sheet. The step associated with the symbol 32 involves having the learners record something about the educational activity. Preferably, this step involves each learner obtaining his/her journal and making an entry into the journal. The entry can be in any suitable form, such as a textual writing, a drawing(s), or some combination thereof. The symbol 32 will be referred to herein as the recordation symbol 32.

Turning now to FIG. 1B, the symbol 34 comprises the depiction of one of a plurality of activity cards used in the illustrated educational system. The activity cards are described hereinbelow, and it shall be sufficient to explain that each activity card includes a series of photographic images depicting photographically (i.e., exactly) what items or steps are to be completed by the learners. For example, some of the activity cards assist with the construction of a model used during the educational activity, and these activity cards will include stepwise depictions of the model during sequential stages of construction. Thus, the symbol 34 instructs the learners to obtain the depicted card and do precisely what is depicted in the photographic images. The symbol 34 will be referred to herein as the card symbol 34.

The symbol 36 comprises an image of a child holding a videotape alongside a monitor and a videotape player. The symbol 36 instructs the learners to obtain, if not already provided, and watch the videotape associated with the educational activity. As will be indicated, videotapes are provided as part of the activity materials to provide supplementary information (e.g., directions) about one or more steps completed during the educational activity. The symbol 36 will be referred to herein as the video symbol 36.

The symbol 38 depicted in FIG. 1B is actually a combination of images of storage bins. The symbol 38 will typically include the image of only one storage bin, as the educational activity will preferably require the contents of only one of the storage bins (described below). However, the principles of the present invention are equally applicable to activities requiring the contents of multiple storage bins, wherein multiple storage bins will be depicted. It is noted that the pictorial symbols are preferably depicted in color, and the illustrated bins are not only different in size and shape but also color. Furthermore, additional storage bins (beyond those illustrated in FIG. 1B) are utilized in the preferred embodiment and will constitute the symbol 38 (e.g., the Primary Gears activity set utilizes a cylindrical storage tub which is depicted as the symbol 38 in connection with that activity set). The symbol 38 instructs the learners to obtain the depicted storage bin(s), open the bin(s), and use the contents of the bin(s) in performing the educational activity. The symbol 38 will be referred to herein as the material symbol 38.

The symbol 40 is an image of four children positioned around an activity surface, with at least one of the children being depicted in the act of talking to the other children. The symbol 40 is associated with the instruction of having the learners discuss the activity (e.g., to share what was learned while completing any pervious steps). The symbol 40 may also be used to instruct the learners to work together to complete one or more of the steps of the educational activity. Although four children are depicted in the symbol 40, the symbol can also be used with a group of two learners. For example, if the educational activity includes the team symbol 24 so that the learners are instructed to group into groups of two learners, the symbol 40 need not necessarily require the learners to regroup into groups of four learners to share information. The symbol 40 will be referred to herein as the discussion symbol 40.

The symbol 42 comprises the image of a girl sorting spherical and cubic items into separate piles. The learners are trained to associate the symbol 42 with the step of sorting the materials given to them (i.e., the storage bin provided in connection with the educational activity). As will be indicated, certain ones of the educational activities have specific sorting criteria. The symbol 42 will be referred to herein as the sort symbol 42.

The symbol 44 comprises the image of a child handing an item to an adult. The symbol 44 is typically associated with the card symbol 34 or the video symbol 36. The instruction provided by the symbol 44 is that the learners are to make the item demonstrated on the corresponding activity card or videotape and then take the item home to show to a parent or guardian. The symbol 44 will be referred to herein as the project symbol 44.

Pictorial instructions for each educational activity are preferably provided to the learners on activity sheets. Each educational activity is preferably associated with a single activity sheet, and each set of activities in the illustrated embodiment consequently corresponds with four activity sheets. The preferred activity sheets are similarly constructed. In the illustrated embodiment, the activity sheets each comprise a paperboard laminated between outer transparent waterproof sheets (hereinafter referred to as laminated paperboard) and provided with indicia on the opposite sides thereof. On the front side, the paperboard is preferably printed with instructional indicia comprising a multiplicity of the pictorial symbols arranged to instruct the learners to perform the educational activity. The back side of the paperboard is preferably printed with inventory indicia depicting the materials needed by the learners in order to perform the educational activity. For illustrative purposes, activity sheets 46,48,50,52 for the Primary Levers activity set are depicted in FIGS. 2–5 and are subsequently described in more detail.

It will be appreciated, however, that the principles of the present invention are equally applicable to various other ways of using the pictorial symbols 20 to instruct the learners to perform one of the educational activities. For example, the present invention encompasses educational systems that utilize a different number of activity sheets in connection with each educational activity (e.g., the instructional and/or inventory indicia for each activity may alternatively be provided on multiple sheets). It is also possible for a single activity sheet to be provided for multiple activities (e.g., the instructional and inventory indicia for an entire set of activities may alternatively be provided on a single sheet). Additional alternative activity sheet configurations are within the ambit of the present invention. For example, all indicia provided on the sheet may be provided on only one side thereof, the inventory indicia may be entirely eliminated from one or more of the activity sheets, or either type of indicia may be provided on both sides of one or more of the activity sheets. The principles of the present invention are also equally applicable to other suitable manners in presenting the pictorial symbols 20 to the learners. For example, each of the pictorial symbols 20 may alternatively be presented as instructional indicia on an individual card. The card may consequently be used in any of the activities requiring the learners to complete the corresponding step. With such an alternative, the cards for each of the educational activities are arranged in the proper order and then presented to the learners (e.g., by displaying all of the cards at once or by displaying the cards sequentially only as the steps are completed). It is also possible to provide the pictorial instructions for one or more of the educational activities on a poster displayed in the classroom. Furthermore, the pictorial instructions may alternatively be presented as a computer screen display. In this scenario, the display could be associated with a computer program that prevents the display of the subsequent symbol until the learners provide an input representing completion of the present step. The input may simply involve punching the return key of the keyboard. Yet further, the pictorial symbols for each educational activity may be displayed as part of a prerecorded audio-visual program that is stopped (e.g., paused) and restarted as the educational activity is performed.

As previously indicated, performance of some of the activities of the preferred educational system involves the use of one or more activity cards. Each activity card preferably comprises laminated paperboard including photographic indicia comprising a series of photographic images. The photographic indicia may be provided on one or both sides of the card. The images are arranged sequentially to represent stepwise completion of the depicted items or steps. Because the learners simply need to complete exactly what is depicted photographically in the images, no training is required to ensure that the cards are properly interpreted and utilized. That is to say, the photographic images of the activity cards are self-explanatory. Generally speaking, the photographic images may be provided to the learners in alternative forms similar to those previously noted with respect to presentation of the pictorial symbols 20 (described above in connection with alternatives to the activity sheets). It is also noted that the term photographic images as used herein shall be interpreted to mean not only actual photographs but also sketched images. For purposes of illustration, the two activity cards 54 and 56 of the Primary Levers activity set are depicted in FIGS. 3–5 and 7 and subsequently described in detail.

Figure 6:
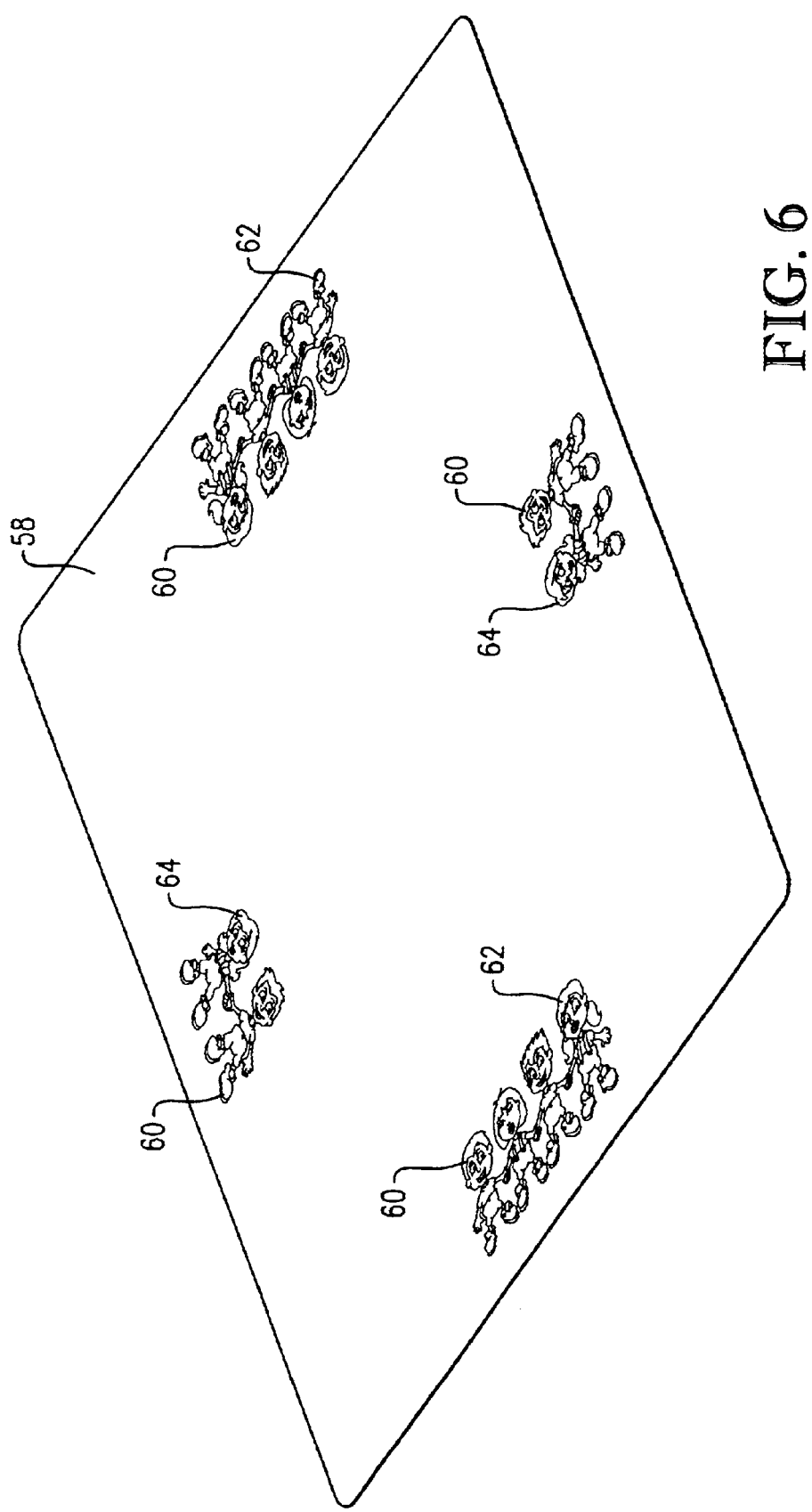
FIG. 6 is a perspective view of an activity mat on which the learner(s) preferably perform the educational activities.
Figure 7:
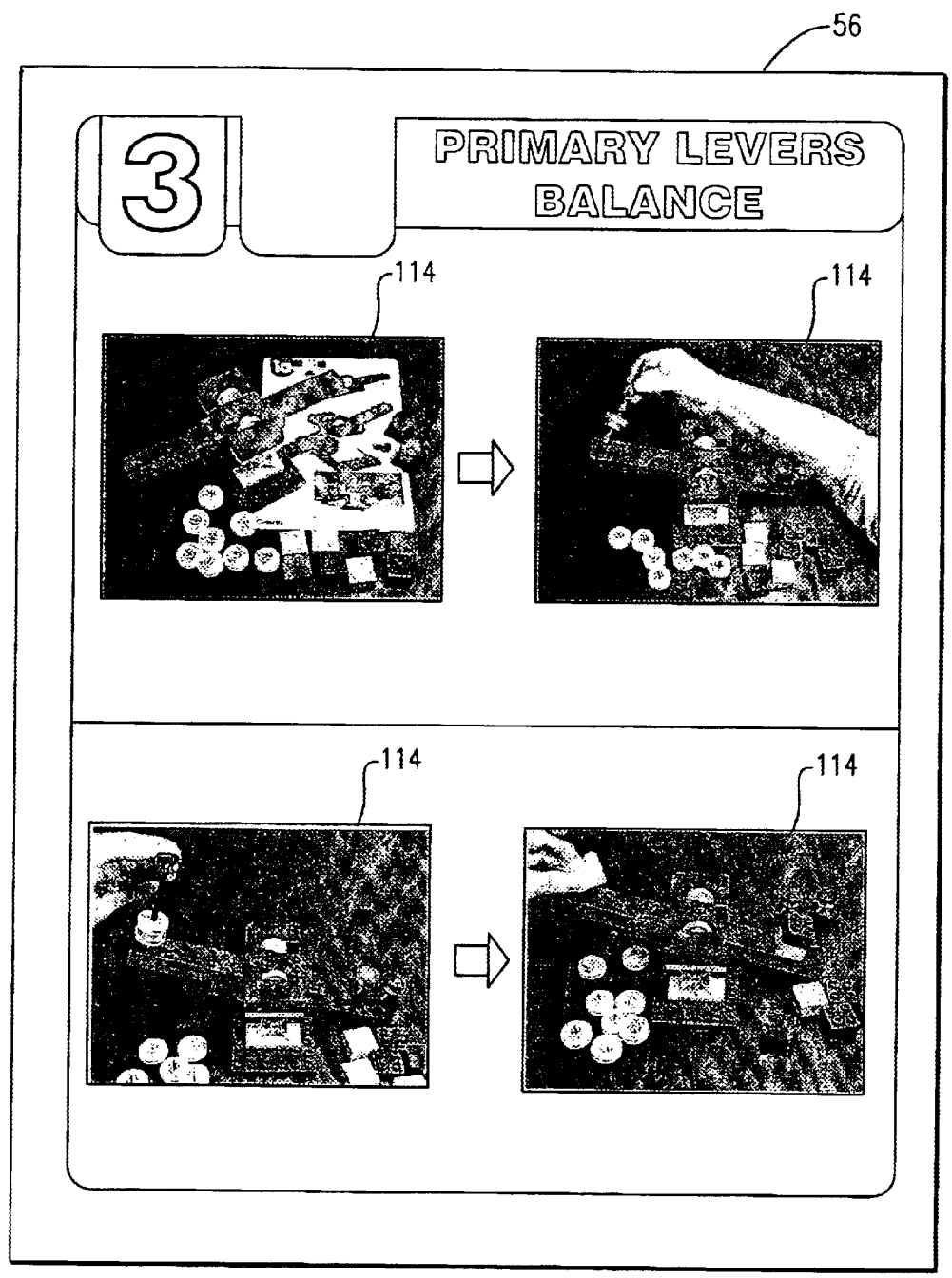
FIG. 7 is a plan view of an activity card used by the learner(s) when performing the third educational activity of the Primary Levers set, particularly illustrating the photographic images providing stepwise instruction on the use of the educational model.

The learners preferably perform each educational activity on one or more activity mats 58 (see FIG. 6), although the activities may be performed on any suitable surface (e.g., a desktop, a table, a uniquely configured workstation, etc.). In the illustrated embodiment, each mat 58 has a rectangular shape. The mat 58 may be formed of any suitable material and, most preferably, is formed of laminated paperboard. Along each side of the mat 58 is participant indicia 60 printed or otherwise provided on the paperboard. The participant indicia 60 along each of the opposite shorter sides of the mat 58 comprises an image 62 of four children holding hands similar to the crew symbol 22. The participant indicia 60 along each of the opposite longer sides of the mat 58 comprises an image 64 of two children holding hands similar to the team symbol 24. The participant indicia 60 serves to position the learners about the mat 58 depending on the number of learners performing the educational activity.

Again, the preferred educational system involves assigning each set of activities to four learners. Each preferred activity set consequently includes two of the mats 58. If, for example, the learners are instructed to separate into groups of two and perform the educational activity separately (note, the activity is preferably the same for both groups), each two-learner group will have one of the mats 58 and the learners of each group will position themselves along the opposite longer sides of the mat 58 (according to the two-learner indicia 64). On the other hand, when all four learners are instructed to perform the educational activity together, the two mats 58 are placed alongside one another (with a long side of one of the mats against a long side of the other mat) and the four players are positioned along the aligned shorter sides of the mats (according to the four-learner indicia 62).

As previously indicated, the preferred educational system utilizes prerecorded audio-visual programs (not shown) for providing visual and verbal information to the learners. The programs are often utilized during educational activities (e.g., see the instructional video symbol 36) to provide supplementary direction to the learners. In some instances, the programs provide the learners with assistance on how to complete certain steps (e.g., the programs may provide information on how to play an educational game during the activity). The programs are preferably stored on a VHS tape, but other suitable storage media (e.g., an optical disc) may be utilized.

The preferred educational system further involves providing the learners with a journal (not shown) in which notes, observations, discoveries and other information about the educational activities may be recorded. The journal may take any suitable form (e.g., a bound notebook, individual sheets placed in a binder, an electronic file stored on a computer readable media, etc.). Journal entries are preferably made according to instructions provided during one of the educational activities (e.g., see the recordation symbol 32), although the learners may otherwise be permitted or requested to record information as deemed appropriate by the instructor. A grading rubric may be established (e.g., according to school district standards) to rate the journal entries made by the learners.

As previously noted, the learners utilize various materials in conducting the preferred educational activities. The educational system preferably includes an inventory of materials for all of the educational activities, and the materials for each activity are obtained from this inventory. For all consumable materials, the preferred system includes enough inventory for one hundred students to utilize the materials. The educational system most preferably involves having the instructor pre-sort materials for each activity prior to it being performed by the learners. One or more material lists may be provided with each activity or activity set to assist the instructor in obtaining the materials needed in performing the activity or activity set from the inventory. Thus, the learners are provided with precisely and only what is needed to perform the activity. The materials are preferably preloaded and contained within an appropriate storage bin (not shown except as depicted as part of the material symbol 38) The storage bins may take any suitable form, such as a plastic container (e.g., rectangular or cylindrical in shape) with a removable lid. It is noted that a number of the activities involve the use of interconnectable toy building blocks. The building blocks have various shapes, sizes and configurations as is necessary to be used in performing the desired activity. One suitable type of building blocks is sold under the designation "LEGO" by Lego Produktion AG. of Baar, Switzerland.

The preferred educational system further includes homework projects that serve to supplement the educational information provided to the learners by each educational activity set. As a matter of interest, the homework projects of the preferred system are referred to under the designation "BACKPACK SCIENCE." The educational system preferably includes a conventional backpack (not shown) that is preloaded by the instructor with materials (utilizing the material inventory described above) to be used by the learner in performing projects outside the classroom (e.g., preferably at home with a parent or guardian). The homework projects vary among the activity sets and are preferably handled individually by each learner. A single backpack and the corresponding materials are associated with each activity set. Thus, when an activity set is assigned to four of the learners in the preferred system, the learners each checkout the backpack (e.g., on a nightly basis) to perform the homework project individually outside the classroom setting.

The materials contained within the backpack preferably include a brief explanation of the educational system and the homework project. In the illustrated educational system, the explanation is referred to as the "Parent Briefing". In addition, the backpack preferably contains a book (not shown) that is to be shared with or read to the learner. The book is preferably a fictional story that relates in educational content to the corresponding activity set. The book is referred to as the "Literature Linkage" in the preferred educational system. The materials also include written directions on how to perform several homework activities that are related substantively to the corresponding activity set. The activity directions may be contained in another book (not shown) provided in the backpack and/or an instructional sheet (also not shown). In the preferred educational system, directions on the instructional sheet are referred to as "Backpack Activity" and "Backpack Extension." The instructional sheet also includes an activity material list identifying the materials used in performing the homework activities (note, some of the activity materials needed to perform the homework activities may not be listed if they are considered readily available in virtually all homes). The backpack also includes the activity materials identified in the list, with these materials preferably being preloaded by the instructor. It is noted that the backpack is preferably formed, at least in part, of a transparent material so that the presence of the necessary homework materials may quickly be confirmed.

The preferred educational system also includes instructor material for assisting the instructor in conducting and directing the use of the preferred educational system. The instructor material preferably includes a guide (not shown) that explains the system and various components thereof. The guide is somewhat similar in content to the description provided herein. Moreover, the preferred instructor material includes an instructor manual (not shown) for each of the activity sets. The manual includes a brief overview of the educational system; a pictorial guide of the instructional symbols 20 (the guide being similar to the table of FIGS. 1A and 1B); an activity set overview introducing the activity set, detailing the objectives of the activity set, and briefly describing the four educational activities; an activity instructional sheet corresponding with each of the educational activities of the set; and a homework project instructional sheet corresponding with the homework project of the activity set. The activity instructional sheets each preferably include four sections: 1) the first section provides detailed written instructions on how to prepare for the corresponding activity, including preparation of the materials used in performing the corresponding activity (entitled "Mission Preparation"); 2) the second section lists all of the materials needed in performing the corresponding activity (entitled "Mission Materials"); 3) the third section explains what the learners are to be doing during the activity and provides insightful hints to the instructor on facilitating the corresponding activity (entitled "Teaching Tips"); and 4) the fourth section suggests specific questions to ask the learners to check for comprehension, encourage higher-level thinking, and cause the learners to expand upon what has been learned during the activity.

A plurality of activity record cards (not shown) are also preferably included as part of the educational system. On the front of each of the cards includes a name space in which one of the learner's name is entered. Activity set tracking spaces are arranged in rows on the front of each card. The tracking rows each include an activity set identification space in which the name of the activity set and date it was started by the learner is entered by the learner or instructor. To the right of the activity set identification space are four activity completion spaces corresponding with the four educational activities of the set (e.g., the leftmost space corresponds with the first activity of the set, the next space to the right corresponds with the second activity of the set, and so on). The learner or instructor marks and/or dates each of activity completion spaces once the corresponding activity has been completed. Each of the learners is associated with at least one of the cards. The rightmost space in each row of activity tracking spaces is a homework project space that permits the learner or instructor to enter whether the homework project for that activity set has been checked out and returned by the learner. The back side of the card is provided with an instructor evaluation permitting the instructor to evaluate and comment on various learner skills observed in connection with each of the activity sets identified on the front side of the card. In the preferred embodiment, the skills specifically identified in the evaluation include cooperation, understanding and participation (identified collectively as personal skills); and observing, predicting, communicating, cooperating, categorizing and ordering (identified collectively as science skills).

Turning now to the description of the activity sets, the set of activities entitled Primary Levers comprises four activities, as do the other activity sets, to be performed by the learners in seriatim preferably on a daily basis (i.e., one activity per day). The overall objective of the Primary Levers activity set is to introduce the learners to the basic principles of levers. More particularly, the learners explore with a set of interconnectable toy building blocks and use the blocks to construct simple levers. Furthermore, the learners experiment with balance utilizing one of the levers they constructed. The activity set culminates with the learners playing a balance game using one of the constructed levers. In playing the game, the learners are required to tally results and count the tally marks to determine a numerical value, both of which further enhance the educational value of the Primary Levers activity set.

Each of the Primary Levers activities corresponds with one of the illustrated activity sheets 46,48,50,52 (see FIGS. 2–5). An iconic identifier 66 and title indicia 68 in the form of the words "Primary Levers" are provided on each of the sheets to identify them as part of the Primary Levers activity set. The iconic identifier 66 preferably depicts two children sitting at opposite ends of a seesaw.

Figure 2A:
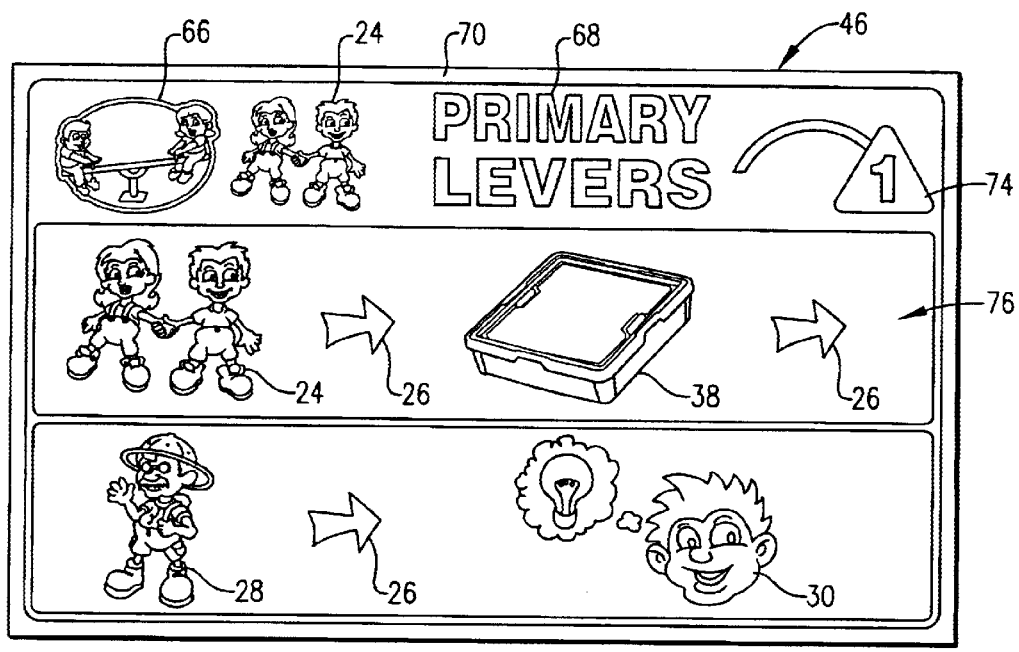
FIG. 2A is a plan view of the front side of the first activity sheet used in the so-called "Primary Levers" set of educational activities of the preferred embodiment, particularly illustrating the instructional indicia for providing graphic, non-textual instructions on how to perform the first educational activity of the set.
Figure 2B:
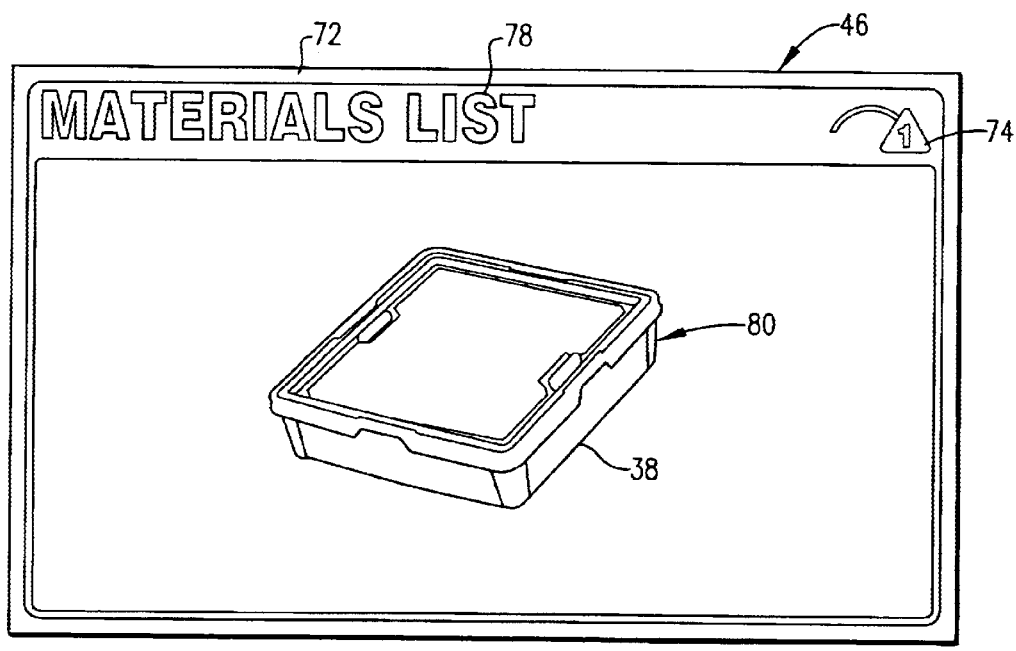
FIG. 2B is a plan view of the back side of the first activity sheet, particularly illustrating the inventory indicia for identifying what items are needed by the learner to perform the first educational activity of the set.

The activity sheet 46 corresponding with the first activity includes a front side 70 (FIG. 2A) and an opposite back side 72 (FIG. 2B). Along the upper margin of the front side 70 of the activity sheet 46 are the iconic identifier 66, title indicia 68, activity indicia 74 including the numeral "1" to identify the activity sheet 46 as corresponding with the first activity of the Primary Levers set, and the team symbol 24 which permits the learner(s) and/or instructor to quickly ascertain the grouping of learners in performing the first activity of the Primary Levers set. Generally speaking, the remaining portion of the front side 70 includes a pair of boxes containing instructional indicia 76 for instructing the learners how to perform the first Primary Levers activity. The instructional indica 76 includes, in order, the team symbol 24, the arrow symbol 26, the material symbol 38, the arrow symbol 26, the exploration symbol 28, the arrow symbol 26 and the idea symbol 30. The instructions provided by the symbol arrangement of the indicia 76 will subsequently be described. The back side 72 of the activity sheet 46 includes along its upper margin the activity indicia 74 and identification indicia 78 in the form of the words "materials list." The back side 72 further includes a box containing inventory indicia 80 that identifies for the learner what is needed to perform the first activity of the Primary Levers set. The inventory indicia 80 comprises the material symbol 38.

As previously noted, the material used to perform the first activity of the Primary Levers set is prepared by the instructor and loaded into the specific storage bin depicted as the inventory indicia 80. The instructor preferably performs these steps before the learners begin the activity. With particular respect to the first activity of the Primary Levers Set, the contents of the bin comprises the interconnectable toy building blocks for building the model 82 shown in FIG. 8. Because each activity set is preferably assigned to four learners and the first Primary Levers activity is to be performed by groups of only two learners, the instructor prepares two storage bins (each with the appropriate contents) and preferably provides two activity sheets 46, one for each of the groups. Furthermore, the learners are provided with two of the activity mats 58 (see FIG. 6), which are preferably used as described hereinabove.

The ordered symbols of the instructional indicia 76 instruct the learners to separate into groups of two, then get the specific depicted bin containing the pre-selected interconnectable toy building blocks, then explore and build with the blocks (the learners can build whatever they desire), and then think of an idea related to what they built (e.g, how could the learners use what they built, etc.). The instructor material associated with the first activity includes questions that should be asked of the learners. In particular, the instructor is suggested to inquire what was built by the learners, whether the built item(s) worked, when the built item(s) could be used, and what the built item(s) could be named.

Figure 3A:
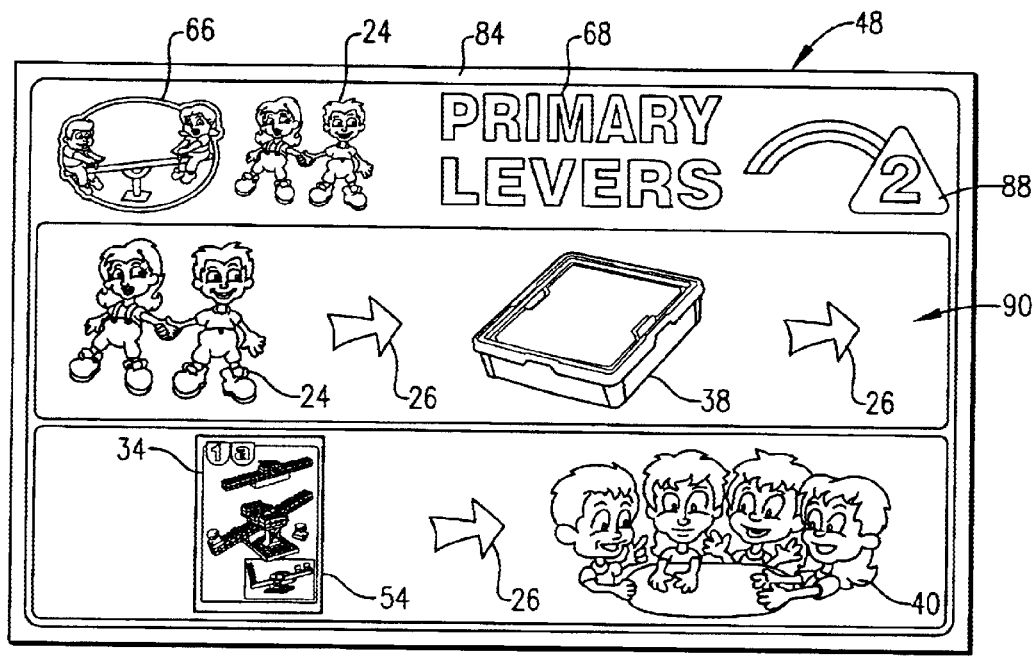
FIG. 3A is a plan view of the front side of the second activity sheet used in the Primary Levers set of educational activities, particularly illustrating the instructional indicia for providing graphic, non-textual instructions on how to perform the second educational activity of the set.
Figure 3B:
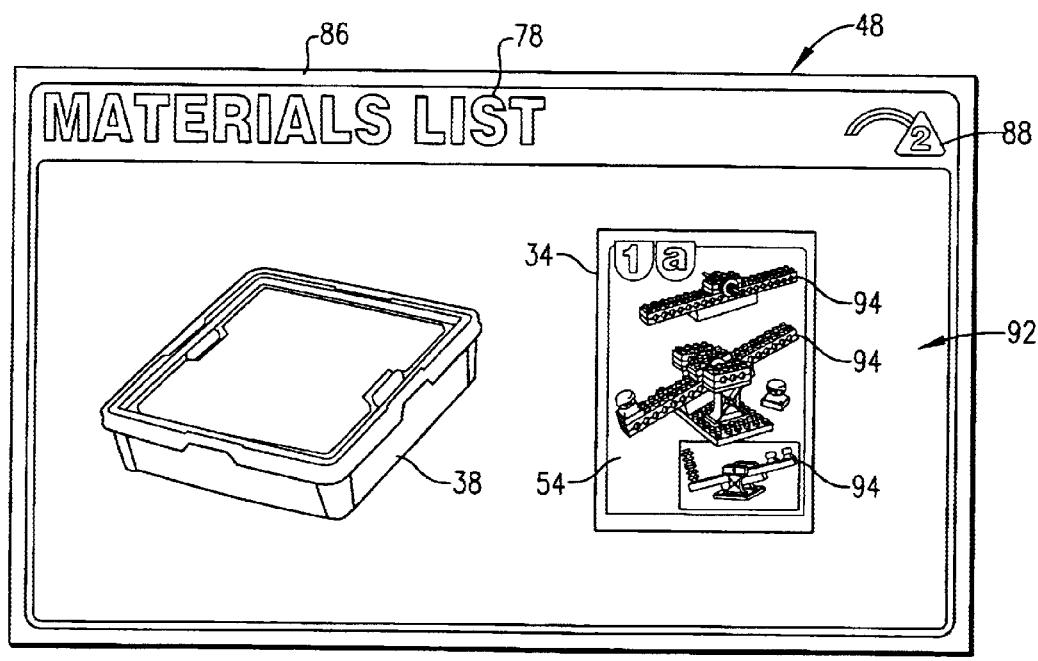
FIG. 3B is a plan view of the back side of the second activity sheet, particularly illustrating the inventory indicia for identifying what items are needed by the learner to perform the second educational activity of the set.

The activity sheet 48 corresponding with the second activity includes a front side 84 (FIG. 3A) and an opposite back side 86 (FIG. 3B). Along the upper margin of the front side 84 of the activity sheet 48 are the iconic identifier 66, title indicia 68, activity indicia 88 including the numeral "2" to identify the activity sheet 48 as corresponding with the second activity of the Primary Levers set, and the team symbol 24. The front side 84 further includes a pair of boxes containing instructional indicia 90 for instructing the learners how to perform the second Primary Levers activity. The instructional indica 90 includes, in order, the team symbol 24, the arrow symbol 26, the material symbol 38, the arrow symbol 26, the card symbol 34, the arrow symbol 26, and the discussion symbol 40. The back side 86 of the activity sheet 48 includes along its upper margin the activity indicia 88 and identification indicia 78. The back side 86 further includes a box containing inventory indicia 92 that identifies for the learner what is needed to perform the second activity of the Primary Levers set. The inventory indicia 92 comprises the card symbol 34 and the material symbol 38.

The contents contained within the storage bin depicted as part of the inventory indicia 92 are the same as those for the first activity. It will also be appreciated that the storage bin is also the same for the first and second activities. Similar to the first activity, the second activity is performed in groups of two. The instructor consequently prepares two storage bins (should only need to confirm that the materials for the first activity were returned to the bin) and preferably provides two activity sheets 46 and two activity cards 54. Furthermore, the learners are provided with two of the activity mats 58 (see FIG. 6).

The ordered symbols of the instructional indicia 90 instruct the learners to separate into groups of two, then get the specific activity card 54 and bin (containing the pre-selected interconnectable toy building blocks), then build the model 82 precisely as depicted on the activity card 54, and then experiment with the model and discuss its operation and use. The activity card 54 includes a series of photographic images 94 depicting stepwise construction and use of the model 82. Particularly, the images 94 depict the model in various stages of construction and in use. The learners use the images 94 to construct the model precisely as depicted. As perhaps best shown in FIG. 8, the model 82 includes a platform 96, a double-legged stand 98 mounted to the platform 96, and a plank 100 supported between the legs of the stand 98 for freely swingable movement. The plank 100 is preferably supported at its center (i.e., the fulcrum for the plank 100 is centered) so that it should naturally be balanced. Humanlike figurines 102 are included as some of the toy building blocks and are consequently attachable to the plank 100. As depicted in the last image 94 of the activity card 54, the learners are encouraged to attach the figurines 102 and any other remaining materials to the plank 100.

The instructor material associated with the second activity suggests that the learners be encouraged to position the figurines 102 at various locations along the length of the plank 100 and attempt to bring the plank 100 back into balance if positioning the figurines 102 causes the plank 100 to dip to either side. The instructor material further includes questions that should be asked of the learners. In particular, the instructor is suggested to inquire whether all of the figurines weighed the same, how this could be determined, and how the plank 100 is brought back into balance when one of the figurines 102 is moved.

Figure 4A:
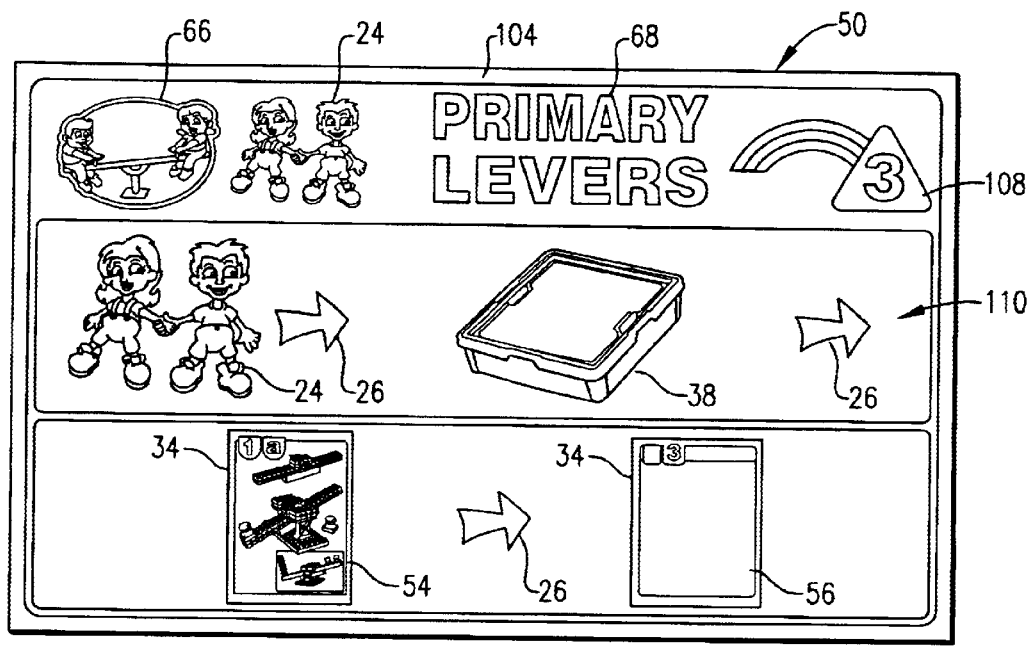
FIG. 4A is a plan view of the front side of the third activity sheet used in the Primary Levers set of educational activities, particularly illustrating the instructional indicia for providing graphic, non-textual instructions on how to perform the third educational activity of the set.
Figure 4B:
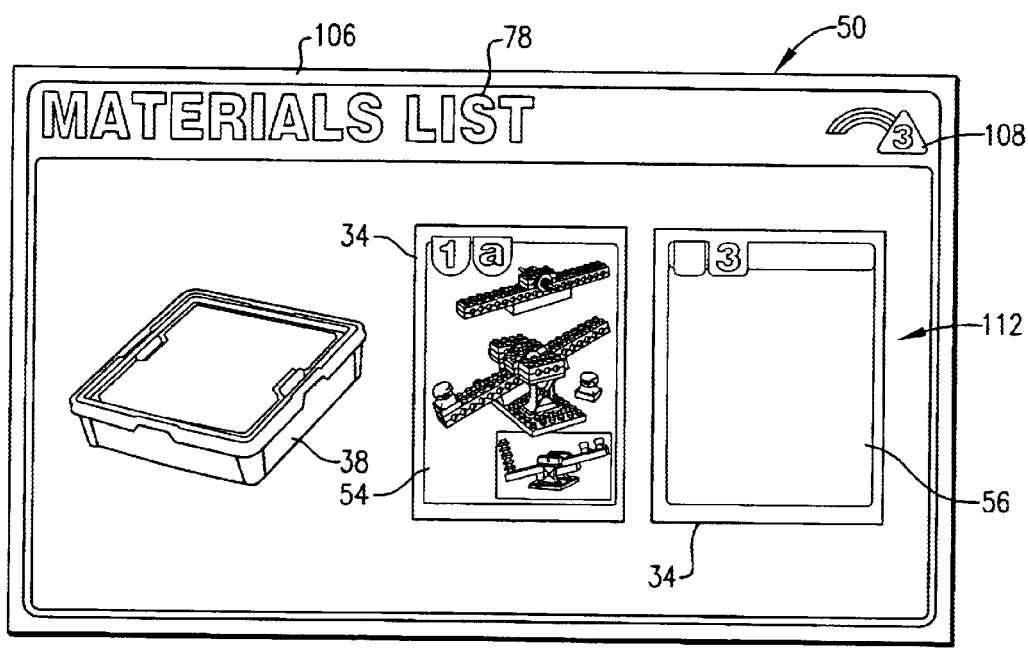
FIG. 4B is a plan view of the back side of the third activity sheet, particularly illustrating the inventory indicia for identifying what items are needed by the learner to perform the third educational activity of the set.

The activity sheet 50 corresponding with the third activity includes a front side 104 (FIG. 4A) and an opposite back side 106 (FIG. 4B). Along the upper margin of the front side 104 of the activity sheet 50 are the iconic identifier 66, title indicia 68, activity indicia 108 including the numeral "3" to identify the activity sheet 50 as corresponding with the third activity of the Primary Levers set, and the team symbol 24. The front side 104 further includes a pair of boxes containing instructional indicia 110 for instructing the learners how to perform the third Primary Levers activity. The instructional indicia 110 includes, in order, the team symbol 24, the arrow symbol 26, the material symbol 38, the arrow symbol 26, the card symbol 34, the arrow symbol 26, and another card symbol 34. The back side 106 of the activity sheet 50 includes along its upper margin the activity indicia 108 and identification indicia 78. The back side 106 further includes a box containing inventory indicia 112 that identifies for the learner what is needed to perform the third activity of the Primary Levers set. The inventory indicia 112 comprises a first card symbol 34 depicting the activity card 54, a second card symbol 34 depicting the activity card 56, and the material symbol 38.

The contents contained within the storage bin depicted as part of the inventory indicia 112 are the same as those for the first and second activities. It will also be appreciated that the storage bin is also the same for the first, second and third activities. Similar to the first and second activities, the third activity is performed in groups of two. The instructor consequently prepares two storage bins (should only need to confirm that the materials for the first and second activities were returned to the bin) and preferably provides two activity sheets 50, two activity cards 54, two activity cards 56, and two activity mats 58.

The ordered symbols of the instructional indicia 110 instruct the learners to separate into groups of two, then get the bin (containing the pre-selected interconnectable toy building blocks), then get the activity card 54 and construct the model 82 precisely as depicted on the activity card 54, and then get the activity card 56 and experiment and use the model 82 as depicted in the activity card 56. As perhaps best shown in FIG. 7, the activity card 56 includes four photographic images 114 arranged in sequence beginning with the upper left image and following the arrows. The images 114 depict stepwise experimentation and use of the model 82. Particularly, the images 114 depict positioning two of the figurines 102 at one end of the plank 100 and then attempting to balance the plank 100 with some of the remaining contents of the bin (i.e., a bar and disks slid onto the bar). The last image 114 (lower right hand corner) depicts placing two stacked blocks adjacent one end of the plank 1100 and then attempting to balance the plank 100 with a single similar block.

The instructor material associated with the third activity suggests that the learners be encouraged to experiment with model 82, particularly as depicted in the activity card 56. Each learner should also be encouraged to position a block(s) on the plank 100 and challenge the other learner to attempt to balance the plank 100. The instructor material further includes questions that should be asked of the learners. In particular, the instructor is suggested to inquire whether the plank 100 can be balanced when different numbers of blocks are placed on opposite sides of the fulcrum, and whether one or more of the figurines 102 can be balanced with other contents from the bin (e.g., the bar and disks depicted in some of the images 114).

Figure 5A:
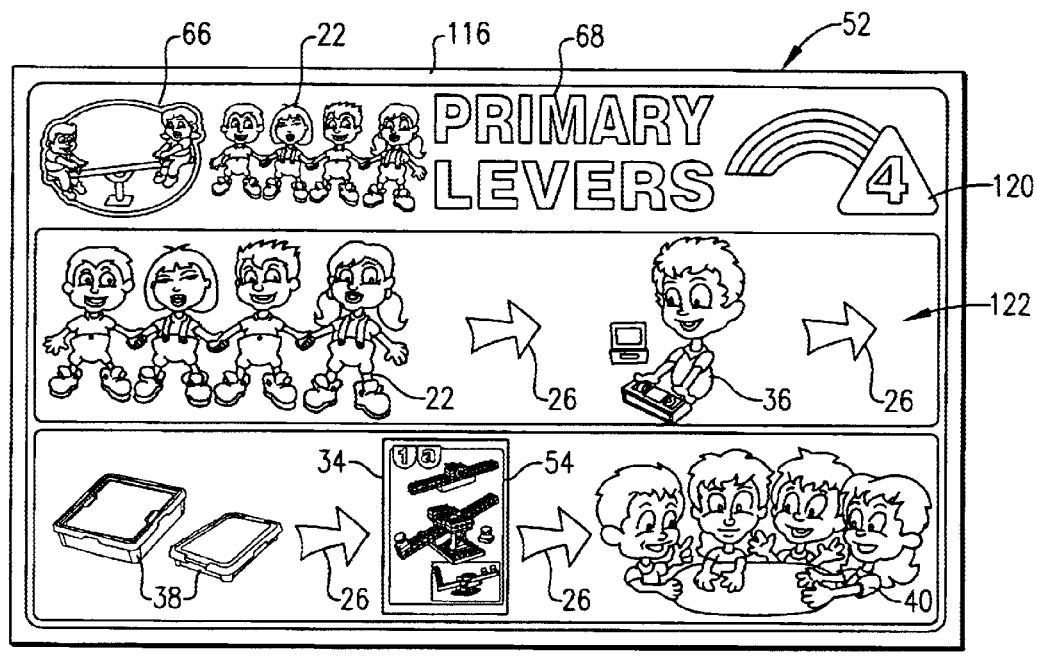
FIG. 5A is a plan view of the front side of the fourth activity sheet used in the Primary Levers set of educational activities, particularly illustrating the instructional indicia for providing graphic, non-textual instructions on how to perform the fourth educational activity of the set.
Figure 5B:
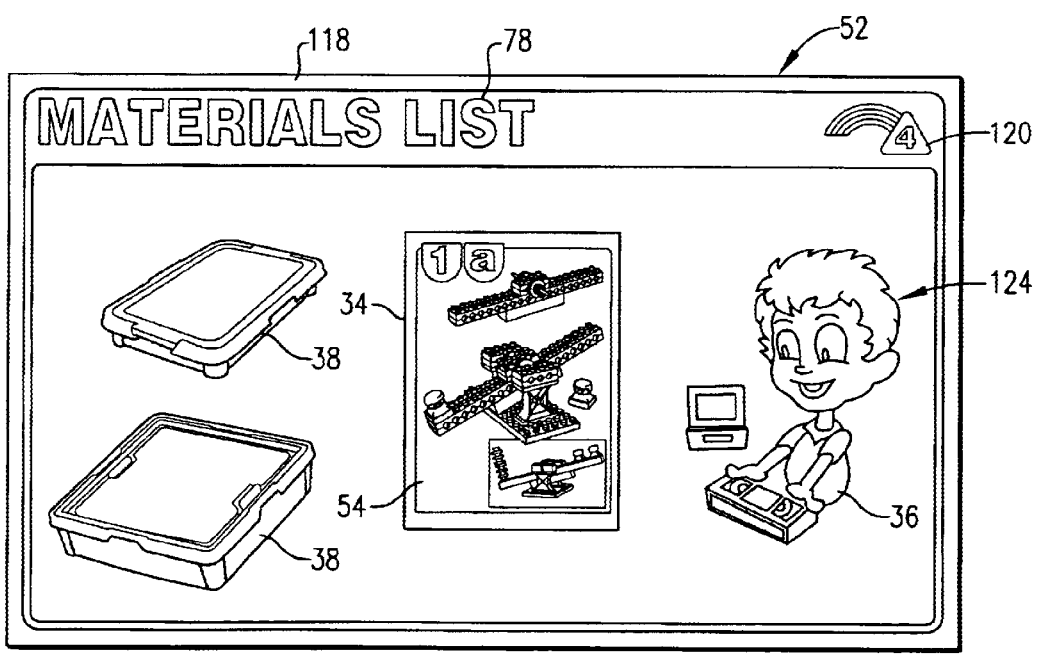
FIG. 5B is a plan view of the back side of the fourth activity sheet, particularly illustrating the inventory indicia for identifying what items are needed by the learner to perform the fourth educational activity of the set.

The activity sheet 52 corresponding with the fourth activity includes a front side 116 (FIG. 5A) and an opposite back side 118 (FIG. 5B). Along the upper margin of the front side 116 of the activity sheet 52 are the iconic identifier 66, title indicia 68, activity indicia 120 including the numeral "4" to identify the activity sheet 52 as corresponding with the fourth activity of the Primary Levers set, and the crew symbol 22. The front side 116 further includes a pair of boxes containing instructional indicia 122 for instructing the learners how to perform the fourth Primary Levers activity. The instructional indica 122 includes, in order, the crew symbol 22, the arrow symbol 26, the video symbol 36, the arrow symbol 26, the material symbol 38, the arrow symbol 26, the card symbol 34, the arrow symbol 26, and the discussion symbol 40. The back side 118 of the activity sheet 52 includes along its upper margin the activity indicia 120 and identification indicia 78. The back side 118 further includes a box containing inventory indicia 124 that identifies for the learner what is needed to perform the fourth activity of the Primary Levers set. The inventory indicia 124 comprises a card symbol 34 depicting the activity card 54, the video symbol 36, and the material symbol 38.

Generally speaking, the fourth activity utilizes the same bin (one of the bins depicted as part of the inventory indicia 124) and contents as the first three activities. The only exception involves an addition to the plank 100 in the form of adhesive stickers 126 each provided with number indicia 128 comprising the numeral one, two, three or four. The stickers are applied to the plank 100 as depicted in FIG. 9. The second bin depicted in the material symbol 38 contains a tally sheet; two chance indicators (not shown) that are each preferably in the form of a four-sided pyramid-shaped element; two pencils, and an equal number (e.g., ten) of similarly shaped but differently colored blocks. It is noted that the sides of each of the chance indicators are associated with the numeral one, two, three and four, respectively. Particularly, the number corresponding with each side of the element is printed on the three remaining sides adjacent the edge common with the corresponding side. Therefore, when the element is rolled, it will eventually come to rest on one of its sides and the number corresponding with that side will be located along the bottom of the three remaining sides. This is considered the number rolled by the learner. As identified by the inventory indicia 124, the instructor must also provide a videotape (not shown) which is provided as part of the inventory of the preferred educational system. The videotape accompanying the fourth activity comprises a prerecorded audio-visual program that explains how a game is played with the model 82 (the game is described below). Although the fourth activity is generally performed by a group of four learners, the instructor is preferably directed to prepare two of each of the bins and the appropriate contents, and provide the learners with two activity sheets 52, two activity cards 54, and the videotape.

The ordered symbols of the instructional indicia 122 instruct the learners to group into a group of four learners, then get the videotape and watch it, then get the storage bins (each containing the appropriate contents), then get the activity card 54 and construct the model 82 precisely as depicted on the activity card 54 (two models 82 will need to be constructed), and then play the game as directed by the videotape program. The game involves having two learners utilizing one of the models 82 to play against one another. Particularly, each of the learners is associated with one side of the plank 100 and one of the sets of colored blocks provided in the new storage bin. The learners alternate turns in rolling the chance indicator and placing their respective blocks on the respective side of the plank 100. The learners are each required to position their respective blocks according to the number rolled using the chance indicator, with the number rolled corresponding with one of the positions on the plank 100. For example, if the learner rolls the number two, a block is placed over the sticker 126 bearing the numeral two (as depicted on the right side of the plank 100 in FIG. 9). A learner is awarded a point when that learner's side of the plank tips. Points are recorded for each learner by entering a tally mark on the tally sheet. Once a block is placed on the plank 100, it cannot be removed until the game has been completed. The game is finished when all of the blocks have been placed on the plank 100 according to the numbers rolled by the learners. The learner with the greatest number of points at the end of the game is declared the winner.

The instructor material associated with the fourth activity includes questions that should be asked of the learners. In particular, the instructor is suggested to inquire what is the best number to roll to increase the chance of tipping the plank 100 in the learner's favor, and which of the numbered positions on the plank 100 are the least and most likely to effect the balance of the plank 100.

The illustrated Primary Levers activity set also preferably includes a homework project. As previously discussed, the homework project supplements the educational activity provided to the learners in each of the four previously detailed classroom activities and is preferably performed outside the classroom. In the preferred homework project for the Primary Levers activity set, the backpack is preloaded with materials including the Parent Briefing, the instructional sheet (including the Backpack Activity and the Backpack Extension), the Literature Linkage, a pencil grip, a metal ruler, ten wooden blocks, a T-pin, and a cork. The preferred homework project includes having the learner perform three activities (as will be described in detail below) and sharing the Literature Linkage with the learner.

The first preferred activity in the homework project for the Primary Levers activity set is described in the book by Susan Canizares, "Simple Machines," Scholastic (1999) at pages 4–5 and is entitled "Table Trick." This activity involves having the learner ask a friend to sit or lie on a table near one edge. The learner then attempts to lift the table, discovering that it is difficult to do so. The learner then places a chair near the table with its seat facing away therefrom and places a broomstick over the chair back. The learner then wedges one end of the broomstick under the table top, places one knee in the chair seat, and slowly pushes down on the free end of the broomstick, thereby discovering that the broomstick, or lever, simplifies the lifting.

The second preferred activity in the homework project is described in the Canizares book at pages 6–7 and is entitled "Balancing Act." This activity involves having the learner cut a cardboard tube in half, lengthwise and place one half on a table, with the cut edge down. The learner then sets the wooden ruler on top of the tube half and places one of the blocks on each end of the ruler in an attempt to make them balance each other. The learner then varies the position of one of the blocks while simultaneously placing more of the blocks on the opposing end in attempt to determine how many blocks can be balanced with the single block, thereby discovering the advantage of a lever about its fulcrum.

The third preferred activity in the homework project, the Backpack Extension, is building a simple balancing sculpture 130 as shown in FIG. 10. The learner constructs the sculpture 130 by sticking a T-pin 132 through a cork 134 as illustrated. The learner then pushes one of a pair of forks 136, 138 into each side of the cork 134 so that the handles of the forks 136, 138 point downward at angles so that the main weight of the forks 136, 138 is below the point of the T-pin 132. The sculpture 130 demonstrates that gravity keeps it standing because the center of gravity is below the point of the T-pin 132.

The preferred Literature Linkage for the homework project for the Primary Levers activity set is the book by Robert E. Wells, "How Do You Lift a Lion," Albert Whitman & Co. (1996). The parent or guardian preferably shares the Wells book with learner by reading the book aloud and the discussing and/or answering any questions the learner may have about the story.

The activity set entitled Primary Wheels and Axles preferably includes four activity sheets, each focused on learner experimentation with the use of wheels and axles. Each of the activity sheets preferably includes an iconic identifier depicting a child pulling a wagon. Preferred objectives of Primary Wheels and Axles include having the learners explore with interconnectable toy building blocks and construct an educational model car with wheels and axles using the interconnectable toy building blocks. An additional expanded objective includes having the learners experiment with wheels and axles by designing their own vehicles. Other progressive objectives involve having the learners experiment with how much force is necessary to start a car moving, measuring the distance the car moved, and making a graph showing how far the car moves in each of several trials.

The first activity sheet of Primary Wheels and Axles is directed to the first educational activity of the set and focuses groups of two learners on exploring with the interconnectable toy building blocks that can be made into a car. The front side of the first activity sheet includes, in order, the team symbol 24, the arrow symbol 26, the material symbol 38, the arrow symbol 26, the exploration symbol 28, the arrow symbol 26, and the idea symbol 30. These ordered symbols are instructional indicia for the learner to form a group of two, then get the bin containing the pre-selected interconnectable toy building blocks for this set, then explore and build with the blocks, and then think of an idea related to what they built (e.g., how does it work, when would you use it, what would you name it, etc.), respectively. The back side of the first activity sheet of the set includes the material symbol 38 relevant to the first activity of the Primary Wheels and Axles set. As it is used here, the material symbol 38 is inventory indicia identifying the corresponding bin preloaded with the building blocks corresponding to the Primary Wheels and Axles set.

The second activity sheet of Primary Wheels and Axles is directed to the second educational activity of the set and focuses groups of two learners on constructing an educational model car using the building blocks and an activity card corresponding to the second activity of this set. The front side of the second activity sheet includes, in order, the team symbol 24, the arrow symbol 26, the material symbol 38, the arrow symbol 26, the card symbol 34, the arrow symbol 26, and the exploration symbol 28. These ordered symbols are instructional indicia for the learner to form a group of two, then get the bin containing the pre-selected building blocks for this set, then build the educational model car exactly as depicted in the photographic images on the respective activity card, and then explore with the model car they have built (e.g., test the car to see if the wheels turn freely, determine if the location of the axles relative to the holes in the car's base makes any difference, etc.), respectively. The back side of the second activity sheet of the set includes the material symbol 38 and the card symbol 34 relevant to the second activity of the Primary Wheels and Axles set. As they are used here, the symbols 38 and 34 are inventory indicia identifying the corresponding bin preloaded with the building blocks and the corresponding activity card, respectively, that are associated with the second activity of the Primary Wheels and Axles set.

The third activity sheet of Primary Wheels and Axles is directed to the third educational activity of the set and focuses groups of two learners on constructing, experimenting with, and drawing an educational model car using the building blocks and an activity card corresponding to the third activity of this set (preferably this model car differs from the models constructed in the previous educational activities of this set). The front side of the third activity sheet includes, in order, the team symbol 24, the arrow symbol 26, the material symbol 38, the arrow symbol 26, the card symbol 34, the arrow symbol 26, and the recordation symbol 32. These ordered symbols are instructional indicia for the learner to form a group of two, then get the bin containing the pre-selected building blocks for this set, then build, modify, and test an educational model car similar to the one depicted in the photographic images on the respective activity card, and then record a drawing of the model car they have built in their journal, respectively. The activity card associated with this activity preferably includes photographic images depicting various alternative modifications of the model to encourage the learners to make their models different from models constructed in previous activities of this set. The back side of the third activity sheet of the set includes the material symbol 38 and the card symbol 34 relevant to the third activity of the Primary Wheels and Axles set. As they are used here, the symbols 38 and 34 are inventory indicia identifying the corresponding bin preloaded with the building blocks and the corresponding activity card, respectively, that are associated with the third activity of the Primary Wheels and Axles set.

The fourth activity sheet of Primary Wheels and Axles is directed to the fourth educational activity of the set and focuses groups of two learners on constructing an educational model car, measuring the distance the car travels on a launcher provided, and recording the results (preferably this model car is the same as the model constructed in the second educational activity of this set). The front side of the fourth activity sheet includes, in order, the team symbol 24, the arrow symbol 26, the video symbol 36, the arrow symbol 26, the material symbol 38, the card symbol 34, the arrow symbol 26, and the discussion symbol 40. These ordered symbols are instructional indicia for the learner to form a group of two, then watch the videotape associated with this educational activity, then get the bin containing the pre-selected building blocks for this set, then build the educational model car depicted in the photographic images on the respective activity card, and then launch the car from the launcher and measure and record the distance it and other group's cars travel, respectively. The videotape associated with this activity preferably depicts learners launching a model car on the launcher, measuring the distance the car travels (e.g., placing different colored "inchworms" end-to-end along one side of the launcher and using erasable markers to mark the farthest inchworm reached), and recording the distance traveled by different model cars (e.g., using a stamp and stamp pad to record the distance traveled on a "recording sheet"). The back side of the fourth activity sheet of the set includes the material symbol 38, the card symbol 34, and the video symbol 36 relevant to the fourth activity of the Primary Wheels and Axles set. As they are used here, the symbols 38, 34, and 36 are inventory indicia identifying the corresponding bin preloaded with the building blocks, the corresponding activity card, and the corresponding videotape, respectively, that are associated with the fourth activity of the Primary Wheels and Axles set.

The Primary Wheels and Axles set preferably includes a homework project for each learner to perform with an adult (e.g., a parent, guardian, etc.) outside the classroom setting. This homework project preferably includes providing the learner with materials that enable the learner to learn about friction and wheels by creating a car from a milk carton, pencils, and thread spools, and that enable the learner to create a windmill that will raise a metal washer. The materials preferably include the book by Susan Canizares, "Simple Machines," Scholastic (1999) and the book by Anne Welsbacher, "Wheels and Axles," Bridgestone (2001). The project preferably includes having the learner perform the "Wacky Wheels" activity described on pages 8 and 9 of Canizares's book and the "Candy Collector" activity described on pages 10 and 11 of Welsbacher's book.

The activity set entitled Primary Gears preferably includes four activity sheets, each focused on learner exploration with how gears fit together. Each of the activity sheets preferably includes an iconic identifier depicting a child holding two interlocking gears. A preferred objective of Primary Gears includes having the learners explore with a set of gears to see how they work together. Additional expanded objectives include having the learners construct an educational model machine that has two gears that go in opposite directions using the interconnectable toy building blocks and constructing a machine with a third gear that makes the gears go in the same direction. Another progressive objective involves having the learners construct a machine with four gears that the learners use to crimp paper.

The first activity sheet of Primary Gears is directed to the first educational activity of the set and focuses groups of four learners on exploring with the interconnectable toy building blocks that include a plurality of gears that fit together. The front side of the first activity sheet includes, in order, the crew symbol 22, the arrow symbol 26, the material symbol 38, the arrow symbol 26, the exploration symbol 28, the arrow symbol 26, and the idea symbol 30. These ordered symbols are instructional indicia for the learner to form a group of four, then get the bin containing the pre-selected interconnectable toy building blocks for this set, then explore and build with the blocks, and then think of an idea related to what they built (e.g., how does it work, when would you use it, what would you name it, etc.), respectively. The back side of the first activity sheet of the set includes the material symbol 38 relevant to the first activity of the Primary Gears set. As it is used here, the material symbol 38 is inventory indicia identifying the corresponding bin preloaded with the building blocks corresponding to the Primary Gears set.

The second activity sheet of Primary Gears is directed to the second educational activity of the set and focuses groups of two learners on constructing an educational model clown's-eye machine having two intermeshing gears that are turned by a handle using the building blocks and activity cards corresponding to the second activity of this set. The front side of the second activity sheet includes, in order, the team symbol 24, the arrow symbol 26, the material symbol 38, the arrow symbol 26, two of the card symbols 34, the arrow symbol 26, and the discussion symbol 40. These ordered symbols are instructional indicia for the learner to form a group of two, then get the bin containing the pre-selected building blocks for this set, then build the educational model clown's-eye machine exactly as depicted in the photographic images on the respective activity cards, and then experiment with and discuss the model machine they have built (e.g., test the machine to see if the eyes turn in the same direction or opposite directions when the handle is turned, determine if turning the handle in the opposite direction makes the eyes turn in the same direction or opposite directions, determine what happens if the handle is turned faster, etc.), respectively. The back side of the second activity sheet of the set includes the material symbol 38 and two of the card symbols 34 relevant to the second activity of the Primary Gears set. As they are used here, the symbols 38 and 34 are inventory indicia identifying the corresponding bin preloaded with the building blocks and the corresponding activity cards, respectively, that are associated with the second activity of the Primary Gears set.

The third activity sheet of Primary Gears is directed to the third educational activity of the set and focuses groups of two learners on constructing and experimenting with an educational model color wheels machine having two geared color wheels interconnected by a central gear that can be turned by a handle, using the building blocks and an activity card corresponding to the third activity of this set. The front side of the third activity sheet includes, in order, the team symbol 24, the arrow symbol 26, the material symbol 38, the arrow symbol 26, two of the card symbols 34, the arrow symbol 26, and the discussion symbol 40. These ordered symbols are instructional indicia for the learner to form a group of two, then get the bin containing the pre-selected building blocks for this set, then build an educational model color wheels machine exactly as depicted in the photographic images on the respective activity cards, and then experiment with and discuss the model machine they have built (e.g., test the machine to see if the color wheels turn in the same direction when the handle is turned, determine why the color wheels move in the same direction but the clown's eyes did not, determine if the wheels move at the same speed, etc.), respectively. The back side of the third activity sheet of the set includes the material symbol 38 and two of the card symbols 34 relevant to the third activity of the Primary Gears set. As they are used here, the symbols 38 and 34 are inventory indicia identifying the corresponding bin preloaded with the building blocks and the corresponding activity cards, respectively, that are associated with the third activity of the Primary Gears set.

The fourth activity sheet of Primary Gears is directed to the fourth educational activity of the set and focuses groups of two learners on constructing an educational model of a machine to crimp paper strips and creating take-home projects with the crimped paper and/or recording a drawing of the project in their journal. The front side of the fourth activity sheet includes, in order, the team symbol 24, the arrow symbol 26, the material symbol 38, the arrow symbol 26, two of the card symbols 34, the arrow symbol 26, and the project symbol 44. These ordered symbols are instructional indicia for the learner to form a group of two, then get the bin containing the pre-selected building blocks for this set, then build the educational model of a machine to crimp paper strips and create crimped paper strips as depicted in the photographic images on the respective activity card, and then create a take-home project using the crimped paper strips and take the project home and show it to a parent or guardian, respectively. The back side of the fourth activity sheet of the set includes the material symbol 38, and two of the card symbols 34 relevant to the fourth activity of the Primary Gears set. As they are used here, the symbols 38 and 34 are inventory indicia identifying the corresponding bin preloaded with the building blocks and the corresponding activity cards, respectively, that are associated with the fourth activity of the Primary Gears set.

The Primary Gears set preferably includes a homework project for each learner to perform with an adult (e.g., a parent, guardian, etc.) outside the classroom setting. This homework project preferably includes providing the learner with materials that enable the learner to use gears, cranks, bases, axles, towers, and connectors to design different structures that move. The materials preferably include the book by Deborah Hodge, "Simple Machines," Kids Can Press (1996) and the book by Learning Resources, Inc., "Gears! Gears! Gears! Building Activities," Learning Resources, Inc. of Vernon Hills, Ill. The project preferably includes having the learner perform the "Basic Building", the "Gear Snake", and the "Gear Towers" activities described on pages 1, 2, and 3, respectively, of Lakeshore's book. The project additionally preferably includes having the adult read and share the Hodge book with the learner.

The activity set entitled Five Senses preferably includes four activity sheets, each focused on learner exploration of the five senses: touching, seeing, hearing, tasting, and smelling. Each of the activity sheets preferably includes an iconic identifier depicting the trunk of a child (including the head and the arms) surrounded by an ear, a hand, a tongue tasting an ice cream cone, a nose, and an eye. A preferred objective of Five Senses includes having the learners explore a variety of materials to discover the different ways we use our senses. Additional expanded objectives include having the learners play a five senses game that reviews how all five senses are used and having the learners use a blind touch box to understand that all senses are used when learning about the world. Another progressive objective involves having the learners construct a "quack cup" to learn that sound is made of vibrations.

The first activity sheet of Five Senses is directed to the first educational activity of the set and focuses groups of four learners on exploring with a variety of materials using the senses of sight, touch, and hearing. The front side of the first activity sheet includes, in order, the crew symbol 22, the arrow symbol 26, the material symbol 38, the arrow symbol 26, the exploration symbol 28, the arrow symbol 26, and the idea symbol 30. These ordered symbols are instructional indicia for the learner to form a group of four, then get the bin containing the pre-selected sight, touch, and hearing materials for this set, then explore the materials with their eyes, fingers, and ears, and then think of an idea related to what they discovered (e.g., what were things that used your sense of sight and how did you use them, what were things that used your sense of hearing and how did you use them, what were things that used your sense of touch and how did you use them, etc.), respectively. The back side of the first activity sheet of the set includes the material symbol 38 relevant to the first activity of the Five Senses set. As it is used here, the material symbol 38 is inventory indicia identifying the corresponding bin preloaded with the sight, touch, and hearing materials corresponding to the Five Senses set.

The second activity sheet of Five Senses is directed to the second educational activity of the set and focuses groups of four learners on playing a touch game utilizing a blind touch box or bag. The front side of the second activity sheet includes, in order, the crew symbol 22, the arrow symbol 26, the video symbol 36, the arrow symbol 26, the material symbol 38, the arrow symbol 26, and the discussion symbol 40. These ordered symbols are instructional indicia for the learner to form a group of four, then watch the videotape associated with this educational activity, then get the bin containing the pre-selected game materials for this set, then play, and discuss, the game depicted in the video with other learners, respectively. The videotape associated with this activity preferably depicts learners playing a touch game involving placing items in a "blind" touch bag that are similar to the materials in the preloaded bin and having other learners try to guess what the item is without being able to see the item. The back side of the second activity sheet of the set includes the material symbol 38 and the video symbol 36 relevant to the second activity of the Five Senses set. As they are used here, the symbols 38 and 36 are inventory indicia identifying the corresponding bin preloaded with the materials and the corresponding videotape, respectively, that are associated with the second activity of the Five Senses set.

The third activity sheet of Five Senses is directed to the third educational activity of the set and focuses groups of four learners on playing a game involving all five of the senses. The front side of the third activity sheet includes, in order, the crew symbol 22, the arrow symbol 26, the video symbol 36, the arrow symbol 26, the material symbol 38, the arrow symbol 26, and the discussion symbol 40. These ordered symbols are instructional indicia for the learner to form a group of four, then watch the videotape associated with this educational activity, then get the game materials for this set, then play, and discuss, the game as depicted in the video with other learners, respectively. The videotape associated with this activity preferably depicts learners playing a game utilizing a spinner that selects one of the five senses thereby requiring a learner to select a game card depicting an item representing one the selected sense (e.g., the Five Senses Game by Lakeshore) and the game materials for this activity set preferably include the same game. The back side of the third activity sheet of the set includes the material symbol 38 and the video symbol 36 relevant to the third activity of the Five Senses set. As they are used here, the symbols 38 and 36 are inventory indicia identifying the corresponding game materials and the corresponding videotape, respectively, that are associated with the third activity of the Five Senses set.

The fourth activity sheet of Five Senses is directed to the fourth educational activity of the set and focuses groups of two learners on constructing an educational model of a "quack cup" to learn that sound is made of vibrations. The front side of the fourth activity sheet includes, in order, the team symbol 24, the arrow symbol 26, the material symbol 38, the arrow symbol 26, two of the card symbols 34, the arrow symbol 26, and the project symbol 44. These ordered symbols are instructional indicia for the learner to form a group of two, then get the bin containing the pre-selected materials for this set, then build the educational model of a quack cup as depicted in the photographic images on the respective activity cards, and then take the quack cup home and show it to a parent or guardian, respectively. The materials and the activity cards for this set preferably enable to the learners to construct a "quack cup" that utilizes a string fixed at one end to a plastic cup and anchored at the other end so that when a damped sponge is pulled along the string, vibrations cause the cup to vibrate thereby creating a "quacking" sound. The back side of the fourth activity sheet of the set includes the material symbol 38 and two of the card symbols 34 relevant to the fourth activity of the Five Senses set. As they are used here, the symbols 38 and 34 are inventory indicia identifying the corresponding bin preloaded with the materials and the corresponding activity cards, respectively, that are associated with the fourth activity of the Five Senses set.

The Five Senses set preferably includes a homework project for each learner to perform with an adult (e.g., a parent, guardian, etc.) outside the classroom setting. This homework project preferably includes providing the learner with materials that enable the learner to use each of the five senses to identify and explore various objects. The materials preferably include the book by Aliki Brandenberg, "My Five Senses," Harper Collins (1989). The project preferably includes having the learner identify various objects using only one of the four senses other than sight (e.g., the learner is blindfolded). The project additionally preferably includes having the adult read and share the Brandenberg book with the learner.

The activity set entitled Farm preferably includes four activity sheets, each focused on learner exploration of a farm, including the equipment and animals located thereon, as well how a farm functions. Each of the activity sheets preferably includes an iconic identifier depicting a child and a chicken riding on a tractor. Preferred objectives of Farm include having the learners construct an educational model farm using interconnectable toy building blocks and using the model farm to solve a real-world problem regarding farming. An additional expanded objective includes having the learners identify animals and the correct terms for the mothers and babies and then use this knowledge to play a game. Another progressive objective involves having the learners use the knowledge of mothers and babies to play a variety of sorting and patterning games, and record the answers in their journal.

The first activity sheet of Farm is directed to the first educational activity of the set and focuses groups of four learners on exploring with the interconnectable toy building blocks and animals that can be made into a farm. The front side of the first activity sheet includes, in order, the crew symbol 22, the arrow symbol 26, the material symbol 38, the arrow symbol 26, the exploration symbol 28, the arrow symbol 26, and the idea symbol 30. These ordered symbols are instructional indicia for the learner to form a group of four, then get the bin containing the pre-selected interconnectable toy building blocks and animals for this set, then explore and build with the blocks and animals, and then think of an idea related to what they built (e.g., do all the animals on a farm live in the same pasture, pen, or corral, what do farm animals need to live and grow, which animals have babies and how do you know which babies go with which mothers, etc.), respectively. The back side of the first activity sheet of the set includes the material symbol 38 relevant to the first activity of the Farm set. As it is used here, the material symbol 38 is inventory indicia identifying the corresponding bin preloaded with the building blocks and animals corresponding to the Farm set.

The second activity sheet of Farm is directed to the second educational activity of the set and focuses groups of four learners on constructing an educational model farm using the building blocks and animals and activity cards corresponding to the second activity of this set. The front side of the second activity sheet includes, in order, the crew symbol 22, the arrow symbol 26, the material symbol 38, the arrow symbol 26, two of the card symbols 34, the arrow symbol 26, and the discussion symbol 40. These ordered symbols are instructional indicia for the learner to form a group of four, then get the bin containing the pre-selected building blocks and animals for this set, then build an educational model farm as depicted in the photographic images on the respective activity cards, and then modify and discuss the model farm they have built with other learners (e.g., how many corrals are needed, how can they be built, how can the barn be used to help build the corrals, can some of the corrals share the same fence, etc.), respectively. The back side of the second activity sheet of the set includes the material symbol 38 and two of the card symbols 34 relevant to the second activity of the Farm set. As they are used here, the symbols 38 and 34 are inventory indicia identifying the corresponding bin preloaded with the building blocks and animals and the corresponding activity cards, respectively, that are associated with the second activity of the Farm set.

The third activity sheet of Farm is directed to the third educational activity of the set and focuses groups of four learners on playing a game involving farm animals. The front side of the third activity sheet includes, in order, the crew symbol 22, the arrow symbol 26, the video symbol 36, the arrow symbol 26, the material symbol 38, the arrow symbol 26, and the discussion symbol 40. These ordered symbols are instructional indicia for the learner to form a group of four, then watch the videotape associated with this educational activity, then get the game materials for this set, then play, and discuss, the game as depicted in the video with other learners, respectively. The videotape associated with this activity preferably depicts learners playing a game where the learners imitate the sounds selected farm animals make (e.g., International Playthings's game entitled "Barnyard Boogie Woogie") and the game materials for this activity set preferably include the same game. The back side of the third activity sheet of the set includes the material symbol 38 and the video symbol 36 relevant to the third activity of the Farm set. As they are used here, the symbols 38 and 36 are inventory indicia identifying the corresponding game materials and the corresponding videotape, respectively, that are associated with the third activity of the Farm set.

The fourth activity sheet of Farm is directed to the fourth educational activity of the set and focuses groups of two learners on constructing a take-home matching wheel game involving farm animals mothers and babies. The front side of the fourth activity sheet includes, in order, the team symbol 24, the arrow symbol 26, the material symbol 38, the arrow symbol 26, two of the card symbols 34, the arrow symbol 26, and the project symbol 44. These ordered symbols are instructional indicia for the learner to form a group of two, then get the bin containing the pre-selected materials for this set, then build the matching wheel game depicted in the photographic images on the respective activity cards, and then take the matching wheel game home and show it to a parent or guardian, respectively. The materials and the activity cards for this set preferably enable to the learners to construct a matching wheel game that utilizes two wheels rotatably fastened (e.g., using round head fasteners, etc.) behind an image of a barn having corresponding cutouts therein, with one wheel having pictures of farm animal babies and the other wheel having pictures of farm animal mothers. In this manner, the wheels can be independently rotated until matching babies and mothers appear in the cutout portions of the barn. The back side of the fourth activity sheet of the set includes the material symbol 38 and two of the card symbols 34 relevant to the fourth activity of the Farm set. As they are used here, the symbols 38 and 34 are inventory indicia identifying the corresponding bin preloaded with the materials and the corresponding activity cards, respectively, that are associated with the fourth activity of the Farm set.

The Farm set preferably includes a homework project for each learner to perform with an adult (e.g., a parent, guardian, etc.) outside the classroom setting. This homework project preferably includes providing the learner with materials that enable the learner to have fun with farm animals. The materials preferably include the book by Sandra Jordan, "Down on Casey's Farm," Orchard (1996) and Learning Resource's Inc.'s game entitled Friendly Farm Animals Game. The project preferably includes having the learner play Fun on the Farm, Pick a Pen, and Barnyard Bingo from the Friendly Farm Animals Game. The project additionally preferably includes having the adult read and share the Jordan book with the learner.

The activity set entitled Construction preferably includes four activity sheets, each focused on learner exploration of the balance, strength, and stability of structures. Each of the activity sheets preferably includes an iconic identifier depicting a child sawing on a board. Preferred objectives of Construction include having the learners construct, and explore with, educational model bridges and towers using interconnectable toy building blocks. An additional expanded objective includes having the learners explore techniques for strengthening structures using the building blocks to learn that the shape of a structure affects its strength. Another progressive objective involves having the learners experiment with how to make structures more stable.

The first activity sheet of Construction is directed to the first educational activity of the set and focuses groups of four learners on exploring with the interconnectable toy building blocks that can be made into bridges and towers. The front side of the first activity sheet includes, in order, the crew symbol 22, the arrow symbol 26, the material symbol 38, the arrow symbol 26, the exploration symbol 28, the arrow symbol 26, and the idea symbol 30. These ordered symbols are instructional indicia for the learner to form a group of four, then get the bin containing the pre-selected interconnectable toy building blocks for this set, then explore and build with the blocks, and then think of an idea related to what they built (e.g., how could you use what you built, when would you use it, what would you name it, etc.), respectively. The back side of the first activity sheet of the set includes the material symbol 38 relevant to the first activity of the Construction set. As it is used here, the material symbol 38 is inventory indicia identifying the corresponding bin preloaded with the building blocks corresponding to the Construction set.

The second activity sheet of Construction is directed to the second educational activity of the set and focuses groups of two learners on constructing educational model bridges and towers using the building blocks and activity cards corresponding to the second activity of this set. The front side of the second activity sheet includes, in order, the team symbol 24, the arrow symbol 26, the material symbol 38, the arrow symbol 26, four of the card symbols 34, the arrow symbol 26, the discussion symbol 40, the arrow symbol 26, and the recordation symbol 32. These ordered symbols are instructional indicia for the learner to form a group of two, then get the bin containing the pre-selected building blocks for this set, then build the educational model bridges and towers exactly as depicted in the photographic images on the respective activity cards, then discuss the model bridges and towers they have built with other learners (e.g., how are the two models alike, different, etc.), and then record a drawing of their models in their journal, respectively. The back side of the second activity sheet of the set includes the material symbol 38 and four of the card symbols 34 relevant to the second activity of the Construction set. As they are used here, the symbols 38 and 34 are inventory indicia identifying the corresponding bin preloaded with the building blocks and the corresponding activity cards, respectively, that are associated with the second activity of the Construction set.

The third activity sheet of Construction is directed to the third educational activity of the set and focuses groups of two learners on constructing educational models resembling bridges and towers using the building blocks and activity cards corresponding to the third activity of this set. The front side of the third activity sheet includes, in order, the team symbol 24, the arrow symbol 26, the material symbol 38, the arrow symbol 26, four of the card symbols 34, the arrow symbol 26, the discussion symbol 40, the arrow symbol 26, and the recordation symbol 32. These ordered symbols are instructional indicia for the learner to form a group of two, then get the bin containing the pre-selected building blocks for this set, then build the educational models exactly as depicted in the photographic images on the respective activity cards, then discuss the models they have built with other learners (e.g., was one of the models stronger than the other model, what changes could be made to increase a model's strength, what real-life objects have you seen that are like the models you built, etc.), and then record a drawing of their models in their journal, respectively. The back side of the third activity sheet of the set includes the material symbol 38 and four of the card symbols 34 relevant to the third activity of the Construction set. As they are used here, the symbols 38 and 34 are inventory indicia identifying the corresponding bin preloaded with the building blocks and the corresponding activity cards, respectively, that are associated with the third activity of the Construction set.

The fourth activity sheet of Construction is directed to the fourth educational activity of the set and focuses groups of four learners on constructing an educational model that demonstrates greater structural strength can be gained by adding a support cable to the model using the building blocks and activity cards corresponding to the fourth activity of this set. The front side of the fourth activity sheet includes, in order, the crew symbol 22, the arrow symbol 26, the material symbol 38, the arrow symbol 26, two of the card symbols 34, the arrow symbol 26, the discussion symbol 40, the arrow symbol 26, and the recordation symbol 32. These ordered symbols are instructional indicia for the learner to form a group of four, then get the bin containing the pre-selected building blocks for this set, then build the educational model exactly as depicted in the photographic images on the respective activity cards, then explore with and discuss the models they have built with other learners (e.g., how is this model different from the other models built in previous educational activities of this set, is this model stronger or weaker, how could you use what you made, etc.), and then record a drawing of their model in their journal, respectively. The back side of the fourth activity sheet of the set includes the material symbol 38 and two of the card symbols 34 relevant to the fourth activity of the Construction set. As they are used here, the symbols 38 and 34 are inventory indicia identifying the corresponding bin preloaded with the building blocks and the corresponding activity cards, respectively, that are associated with the fourth activity of the Construction set.

The Construction set preferably includes a homework project for each learner to perform with an adult (e.g., a parent, guardian, etc.) outside the classroom setting. This homework project preferably includes providing the learner with materials that enable the learner to explore with building structures (e.g., houses, furniture, transportation vehicles, etc.). The materials preferably include toy building logs (e.g., Color Craft Sticks, etc.) and the book by Lars Klove, "Trucks That Build," First Aladdin (1999). The project preferably includes having the learner build geometric shapes, toy houses, toy furniture, toy vehicles, etc. using the building logs. The project additionally preferably includes having the adult read and share the Klove book with the learner.

The activity set entitled Community preferably includes four activity sheets, each focused on learner exploration of building a community. Each of the activity sheets preferably includes an iconic identifier depicting a child wearing a fireman's hat and holding a firehose with a house in the background. Preferred objectives of Community include having the learners construct, and explore with, educational model communities, including service providers such as police and fire stations using interconnectable toy building blocks. An additional expanded objective includes having the learners construct a transportation system for their model community using the building blocks. Another progressive objective involves having the learners practice recording data by drawing the individual buildings of their model community in their journal.

The first activity sheet of Community is directed to the first educational activity of the set and focuses groups of four learners on exploring with the interconnectable toy building blocks that can be made into a model of a community. The front side of the first activity sheet includes, in order, the crew symbol 22, the arrow symbol 26, the material symbol 38, the arrow symbol 26, the card symbol 34, the arrow symbol 26, the exploration symbol 28, the arrow symbol 26, and the idea symbol 30. These ordered symbols are instructional indicia for the learner to form a group of four, then get the bin containing the pre-selected interconnectable toy building blocks for this set, then construct one or more of the individual models in the model community depicted in the photographic images on the respective activity card, then explore with the models, and then think of an idea related to what they built (e.g., how could you use what you built, when would you use it, if you built a town, what would you name it, etc.), respectively. The back side of the first activity sheet of the set includes the material symbol 38 and the card symbol 34 relevant to the first activity of the Community set. As they are used here, the material symbol 38 and the card symbol 34 are inventory indicia identifying the corresponding bin preloaded with the building blocks and the corresponding activity card, respectively, that are associated with the first activity of the Community set.

The second activity sheet of Community is directed to the second educational activity of the set and focuses groups of four learners on constructing educational model houses using the building blocks and activity cards corresponding to the second activity of this set. The front side of the second activity sheet includes, in order, the crew symbol 22, the arrow symbol 26, the material symbol 38, the arrow symbol 26, three of the card symbols 34, the arrow symbol 26, the idea symbol 30, the arrow symbol 26, and the recordation symbol 32. These ordered symbols are instructional indicia for the learner to form a group of four, then get the bin containing the pre-selected building blocks for this set, then build the educational model houses as depicted in the photographic images on the respective activity cards, then think of an idea related to what they have built (e.g., do all houses look the same, why are some houses different, does everyone live in a house, what are some other types of homes in which people live, etc.), and then record a drawing of their model in their journal, respectively. The back side of the second activity sheet of the set includes the material symbol 38 and three of the card symbols 34 relevant to the second activity of the Community set. As they are used here, the symbols 38 and 34 are inventory indicia identifying the corresponding bin preloaded with the building blocks and the corresponding activity cards, respectively, that are associated with the second activity of the Community set.

The third activity sheet of Community is directed to the third educational activity of the set and focuses groups of four learners on constructing educational models of a transportation system and service providers for a community using the building blocks and activity cards corresponding to the third activity of this set. The front side of the third activity sheet includes, in order, the crew symbol 22, the arrow symbol 26, the material symbol 38, the arrow symbol 26, two of the card symbols 34, the arrow symbol 26, the idea symbol 30, the arrow symbol 26, and the recordation symbol 32. These ordered symbols are instructional indicia for the learner to form a group of four, then get the bin containing the pre-selected materials and building blocks for this set, then build the educational models as depicted in the photographic images on the respective activity cards, then think of an idea relevant to the models they have built (e.g., which workers are in your community, why are community services important in a community, etc.), and then record a drawing of their models in their journal, respectively. The materials for this activity preferably include a giant road mat operable to receive the learners' models (e.g., road signs, community worker figures, etc.) and that enables the learners to role-play community workers. The back side of the third activity sheet of the set includes the material symbol 38 and two of the card symbols 34 relevant to the third activity of the Community set. As they are used here, the symbols 38 and 34 are inventory indicia identifying the corresponding bin preloaded with the materials and building blocks and the corresponding activity cards, respectively, that are associated with the third activity of the Community set.

The fourth activity sheet of Community is directed to the fourth educational activity of the set and focuses groups of four learners on constructing an educational model of a complete community using the materials, building blocks and activity cards corresponding to the fourth activity of this set. The front side of the fourth activity sheet includes, in order, the crew symbol 22, the arrow symbol 26, the material symbol 38, the arrow symbol 26, two of the card symbols 34, the arrow symbol 26, the idea symbol 30, the arrow symbol 26, and the recordation symbol 32. These ordered symbols are instructional indicia for the learner to form a group of four, then get the bin containing the pre-selected materials and building blocks for this set, then build the educational model as depicted in the photographic images on the respective activity cards, then think of an idea relevant to the model they have built (e.g., how is your community different from, or the same as, a real community, what did you name your community, what else would you add to your community if you could, etc.), and then record a drawing of their model in their journal, respectively. The materials for this activity preferably include a giant road mat operable to receive the learners' models (e.g., houses, community-service buildings, road signs, community-service worker figures, etc.) and that enables the learners to role-play community workers. The back side of the fourth activity sheet of the set includes the material symbol 38 and two of the card symbols 34 relevant to the fourth activity of the Community set. As they are used here, the symbols 38 and 34 are inventory indicia identifying the corresponding bin preloaded with the materials and building blocks and the corresponding activity cards, respectively, that are associated with the fourth activity of the Community set.

The Community set preferably includes a homework project for each learner to perform with an adult (e.g., a parent, guardian, etc.) outside the classroom setting. This homework project preferably includes providing the learner with materials that enable the learner to explore what makes up a community (e.g., homes, stores, police, fire, government, post office, schools, library, etc.). The materials preferably include toy model community (e.g., Childcraft Mini Town Mat, die-cast toy vehicles, etc.) and the book by Rebecca Treays, "My Town," Usborne/EDC (1998). The project preferably includes having the learner maneuver around the model community and discuss the places he/she visits. The project additionally preferably includes having the adult read and share the Treays book with the learner.

The activity set entitled Color and Light preferably includes four activity sheets, each focused on learner exploration of light, how it travels, and that it is made up of a spectrum of colors. Each of the activity sheets preferably includes an iconic identifier depicting the trunk of a child (including the head and the arms) holding a flashlight that projects a spot against a contrasting colored background. A preferred objective of Color and Light includes having the learners explore light and color using a variety of materials. Additional expanded objectives include having the learners use diffraction grating glasses and spinning tops to learn that white light is made up of a spectrum of colors and having the learners make discoveries about shadows, light, and reflections by using a flashlight and a series of panels. Another progressive objective involves having the learners record the order of the spectrum in a rainbow book, using diffraction grating glasses to view the spectrum and colored pencils to record the colors in the rainbow.

The first activity sheet of Color and Light is directed to the first educational activity of the set and focuses groups of two learners on exploring light using a variety of materials. The front side of the first activity sheet includes, in order, the team symbol 24, the arrow symbol 26, the material symbol 38, the arrow symbol 26, the exploration symbol 28, the arrow symbol 26, and the idea symbol 30. These ordered symbols are instructional indicia for the learner to form a group of two, then get the bin containing the pre-selected color and light materials for this set, then explore the materials, and then think of an idea related to what they discovered (e.g., what did you discover using the flashlight, how did the light from the flashlight change when you held it in front of the color paddles, how did you use the mirrors, what happened when you looked through the glasses or spun the top, etc.), respectively. The color and light materials preferably include mirrors, panels, flashlights, color paddles, and diffraction glasses. The back side of the first activity sheet of the set includes the material symbol 38 relevant to the first activity of the Color and Light set. As it is used here, the material symbol 38 is inventory indicia identifying the corresponding bin preloaded with the color and light materials corresponding to the Color and Light set.

The second activity sheet of Color and Light is directed to the second educational activity of the set and focuses groups of four learners on conducting an experiment on how light travels. The front side of the second activity sheet includes, in order, the crew symbol 22, the arrow symbol 26, the video symbol 36, the arrow symbol 26, the material symbol 38, the arrow symbol 26, and the discussion symbol 40. These ordered symbols are instructional indicia for the learner to form a group of four, then watch the videotape associated with this educational activity, then get the bin containing the pre-selected experiment materials for this set, then conduct, and discuss, the light experiment depicted in the video with other learners, respectively. The videotape associated with this activity preferably depicts learners conducting a light experiment (using materials that are similar to the materials in the preloaded bin) demonstrating that light travels in a straight line and when something is blocking the light, a shadow is created. The back side of the second activity sheet of the set includes the material symbol 38 and the video symbol 36 relevant to the second activity of the Color and Light set. As they are used here, the symbols 38 and 36 are inventory indicia identifying the corresponding bin preloaded with the materials and the corresponding videotape, respectively, that are associated with the second activity of the Color and Light set.

The third activity sheet of Color and Light is directed to the third educational activity of the set and focuses groups of four learners on conducting an experiment on how light reflects and how it travels once reflected. The front side of the third activity sheet includes, in order, the crew symbol 22, the arrow symbol 26, the video symbol 36, the arrow symbol 26, the material symbol 38, the arrow symbol 26, and the discussion symbol 40. These ordered symbols are instructional indicia for the learner to form a group of four, then watch the videotape associated with this educational activity, then get the bin containing the pre-selected experiment materials for this set, then conduct, and discuss, the reflection experiment depicted in the video with other learners, respectively. The videotape associated with this activity preferably depicts learners conducting a reflection experiment (using materials that are similar to the materials in the preloaded bin) demonstrating that you can predict where light will travel when reflected (e.g., using a flashlight and a mirror to reflect light around a panel and onto a target). The back side of the third activity sheet of the set includes the material symbol 38 and the video symbol 36 relevant to the third activity of the Color and Light set. As they are used here, the symbols 38 and 36 are inventory indicia identifying the corresponding bin preloaded with the materials and the corresponding videotape, respectively, that are associated with the third activity of the Color and Light set.

The fourth activity sheet of Color and Light is directed to the fourth educational activity of the set and focuses groups of four learners on creating a project involving recording the colors of a rainbow. The front side of the fourth activity sheet includes, in order, the crew symbol 22, the arrow symbol 26, the material symbol 38, the arrow symbol 26, two of the card symbols 34, the arrow symbol 26, and the project symbol 44. These ordered symbols are instructional indicia for the learner to form a group of four, then get the bin containing the pre-selected project materials for this set, then create the project depicted in the photographic images on the respective activity cards, then take the project home and show it to a parent or guardian, respectively. The project of this activity preferably includes the learners creating a rainbow book by recording the colors of a rainbow as viewed by the learner through diffraction glasses. The back side of the fourth activity sheet of the set includes the material symbol 38 and two of the card symbols 34 relevant to the fourth activity of the Color and Light set. As they are used here, the symbols 38 and 34 are inventory indicia identifying the corresponding bin preloaded with the project materials and the corresponding activity cards, respectively, that are associated with the fourth activity of the Color and Light set.

The Color and Light set preferably includes a homework project for each learner to perform with an adult (e.g., a parent, guardian, etc.) outside the classroom setting. This homework project preferably includes providing the learner with materials that enable the learner to conduct simple experiments with color and light. The materials preferably include the book by Melvin Berger, "Light," Newbridge (1996). The project preferably includes having the learner conduct simple experiments with light, what it is made up of, and how it travels (e.g., reflecting light off of a mirror and directing it trough one or more tubes, placing a straw partially in a glass of water to discover it "bends," shining light through various colored paddles, creating shadow objects on the wall, etc.). The project additionally preferably includes having the adult read and share the Berger book with the learner.

The activity set entitled Seeds preferably includes four activity sheets, each focused on learner exploration of seeds and plants. Each of the activity sheets preferably includes an iconic identifier depicting the trunk of a child (including the head and the arms) holding a magnifying glass inspecting a seed from a planter. A preferred objective of Seeds includes having the learners observe baby plants inside a seed and sort seeds by various attributes. Additional expanded objectives include having the learners examine seeds and plants while using magnifying lenses and having the learners make discoveries about seeds and how they travel. Another progressive objective involves having the learners play a game involving common plants that have seeds.

The first activity sheet of Seeds is directed to the first educational activity of the set and focuses groups of two learners on exploring a variety of seeds, sorting the seeds, and using the seeds to create a take-home project. The front side of the first activity sheet includes, in order, the team symbol 24, the arrow symbol 26, three of the material symbols 38, the arrow symbol 26, the card symbol 34, the arrow symbol 26, the sort symbol 42, the arrow symbol 26, and the project symbol 44. These ordered symbols are instructional indicia for the learner to form a group of two, then get the bins containing the pre-selected seed materials for this set, then sort the seeds as depicted in the respective activity card and create a take-home art project, and then take the project home and share it with a parent or guardian, respectively. The seed materials preferably include bags of beans (e.g., 15 bean soup, etc.), sorting trays, glue, and object outlines on paper (e.g., a drawing of a flower, etc.). The back side of the first activity sheet of the set includes the material symbols 38 and the card symbol 34 relevant to the first activity of the Seeds set. As they are used here, the material symbols 38 and the card symbol 34 are inventory indicia identifying the corresponding bins preloaded with the seed materials and the corresponding activity card, respectively, associated with the first activity of the Seeds set.

The second activity sheet of Seeds is directed to the second educational activity of the set and focuses groups of four learners on conducting an experiment on how plants grow and then creating a take-home model of a seed. The front side of the second activity sheet includes, in order, the crew symbol 22, the arrow symbol 26, the material symbol 38, the arrow symbol 26, the video symbol 36, the arrow symbol 26, the card symbol 34, and the project symbol 44. These ordered symbols are instructional indicia for the learner to form a group of four, then get the bin containing the pre-selected experiment materials for this set, then watch the videotape associated with this educational activity, then conduct the plant experiment and create the take-home model as depicted in the photographic images of the respective activity card, and then take the model home and share it with a parent or guardian, respectively. The videotape associated with this activity preferably depicts how plants grow, or related content, and the activity card preferably depicts an experiment on discovering what a baby plant looks like inside a seed (e.g., open a soaked lima bean and use magnifying lenses to observe what is inside the bean). The back side of the second activity sheet of the set includes the material symbol 38, the card symbol 34, and the video symbol 36 relevant to the second activity of the Seeds set. As they are used here, the symbols 38,34, and 36 are inventory indicia identifying the corresponding bin preloaded with the materials, the respective activity card, and the corresponding videotape, respectively, that are associated with the second activity of the Seeds set.

The third activity sheet of Seeds is directed to the third educational activity of the set and focuses groups of four learners on creating a take-home model of a seed floater. The front side of the third activity sheet includes, in order, the crew symbol 22, the arrow symbol 26, the material symbol 38, the arrow symbol 26, the video symbol 36, the arrow symbol 26, the card symbol 34, and the project symbol 44. These ordered symbols are instructional indicia for the learner to form a group of four, then get the bin containing the pre-selected materials for this set, then watch the videotape associated with this educational activity, then create the take-home model as depicted in the photographic images of the respective activity card, and then take the model home and share it with a parent or guardian, respectively. The videotape associated with this activity preferably depicts how seeds travel, or related content, and the activity card preferably depicts a model of a seed floater (e.g., made of construction paper strips and paper clips, etc.). The back side of the third activity sheet of the set includes the material symbol 38, the card symbol 34, and the video symbol 36 relevant to the third activity of the Seeds set. As they are used here, the symbols 38, 34, and 36 are inventory indicia identifying the corresponding bin preloaded with the materials, the respective activity card, and the corresponding videotape, respectively, that are associated with the third activity of the Seeds set.

The videotapes previously discussed in connection with the second and third education activities of Seeds could be a single videotape incorporating both of the preferred contents (e.g., how a pumpkin grows from a seed and how those seeds are scattered).

The fourth activity sheet of Seeds is directed to the fourth educational activity of the set and focuses groups of four learners on playing a game involving seeds. The front side of the fourth activity sheet includes, in order, the crew symbol 22, the arrow symbol 26, the material symbol 38, the arrow symbol 26, the video symbol 36, the arrow symbol 26, and the discussion symbol 40. These ordered symbols are instructional indicia for the learner to form a group of four, then get the game materials for this set, then watch the videotape associated with this educational activity, then play, and discuss, the game as depicted in the video with other learners, respectively. The videotape associated with this activity preferably depicts learners playing a Bingo-type game involving seeds (e.g., one learner draws seed cards and calls the name of the seed on the card and the other learners places a seed marker on the picture of that seed if it is on his/her score card) and the game materials for this activity set preferably include the same game. The back side of the fourth activity sheet of the set includes the material symbol 38 and the video symbol 36 relevant to the fourth activity of the Seeds set. As they are used here, the symbols 38 and 36 are inventory indicia identifying the corresponding game materials and the corresponding videotape, respectively, that are associated with the fourth activity of the Seeds set.

The Seeds set preferably includes a homework project for each learner to perform with an adult (e.g., a parent, guardian, etc.) outside the classroom setting. This homework project preferably includes providing the learner with materials that enable the learner to conduct simple experiments with seeds and plants. The materials preferably include the book by Jean Marzollo, "I'm a Seed," Scholastic (1996). The project preferably includes having the learner conduct simple experiments with seeds and how they grow into plants (e.g., placing a peat pellet into a bowl of water, placing a lima bean into the peat, covering with plastic, and monitoring its growth, etc.). The project additionally preferably includes having the adult read and share the Marzollo book with the learner.

The activity set entitled Sink or Float preferably includes four activity sheets, each focused on learner exploration why things sink or float. Each of the activity sheets preferably includes an iconic identifier depicting two children playing with toy boats in a tub. A preferred objective of Sink or Float includes having the learners explore with a variety of materials to discover some of the properties of materials that cause them to sink or float. Additional expanded objectives include having the learners practice making predictions and recording answers in a journal about things that sink or float and having the learners experiment with various materials and water to discover the relationship of shape, weight, and size in things that sink or float. Another progressive objective involves having the learners create a model boat from clay and test to see if it sinks or floats.

The first activity sheet of Sink or Float is directed to the first educational activity of the set and focuses groups of two learners on exploring using a variety of materials that sink or float. The front side of the first activity sheet includes, in order, the team symbol 24, the arrow symbol 26, the material symbol 38, the arrow symbol 26, the exploration symbol 28, the arrow symbol 26, and the idea symbol 30. These ordered symbols are instructional indicia for the learner to form a group of two, then get the bin containing the pre-selected sink or float materials for this set, then explore the materials, and then think of an idea related to what they discovered (e.g., were all of the materials the same shape or size, did any of the materials react to the water in a way that surprised you, etc.), respectively. The sink or float materials preferably include a clear plastic container half-filled with water, various sized buttons, various sized pebbles, various sized toys having different shapes and being formed of different materials. The back side of the first activity sheet of the set includes the material symbol 38 relevant to the first activity of the Sink or Float set. As it is used here, the material symbol 38 is inventory indicia identifying the corresponding bin preloaded with the sink or float materials corresponding to the Sink or Float set.

The second activity sheet of Sink or Float is directed to the second educational activity of the set and focuses groups of two learners on conducting an experiment on predicting whether certain objects will sink or float. The front side of the second activity sheet includes, in order, the team symbol 24, the arrow symbol 26, the material symbol 38, the arrow symbol 26, the video symbol 36, the idea symbol 30, the arrow symbol 26, and the recordation symbol 32. These ordered symbols are instructional indicia for the learner to form a group of two, then get the bin containing the pre-selected experiment materials for this set, then watch the videotape associated with this educational activity and conduct the sink or float experiment depicted in the video, and then record the results in their journal, respectively. The videotape associated with this activity preferably depicts learners conducting a sink or float experiment (using materials that are similar to the materials in the preloaded bin) wherein learners predict whether a selected object will sink or float, test their predictions with the actual object, and then record their results. The back side of the second activity sheet of the set includes the material symbol 38 and the video symbol 36 relevant to the second activity of the Sink or Float set. As they are used here, the symbols 38 and 36 are inventory indicia identifying the corresponding bin preloaded with the materials and the corresponding videotape, respectively, that are associated with the second activity of the Sink or Float set.

The third activity sheet of Sink or Float is directed to the third educational activity of the set and focuses groups of two learners on conducting an experiment on finding a shape for a model boat that will float. The front side of the third activity sheet includes, in order, the team symbol 24, the arrow symbol 26, the material symbol 38, the arrow symbol 26, the card symbol 34, the arrow symbol 26, the discussion symbol 40, the arrow symbol 26, and the recordation symbol 32. These ordered symbols are instructional indicia for the learner to form a group of two, then get the bin containing the pre-selected experiment materials for this set, then create a model boat and test if it will float as depicted in the photographic images on the respective activity card, then modify (if necessary), and discuss, the shape of the model and how it affected the model's ability to float with other learners, and then record a drawing of the resultant model in their journal, respectively. The back side of the third activity sheet of the set includes the material symbol 38 and the card symbol 34 relevant to the third activity of the Sink or Float set. As they are used here, the symbols 38 and 34 are inventory indicia identifying the corresponding bin preloaded with the materials and the corresponding activity card, respectively, that are associated with the third activity of the Sink or Float set.

The fourth activity sheet of Sink or Float is directed to the fourth educational activity of the set and focuses groups of two learners on conducting an experiment to determine how many washers it takes to sink various toy boats. The front side of the fourth activity sheet includes, in order, the team symbol 24, the arrow symbol 26, the material symbol 38, the arrow symbol 26, the card symbol 34, the arrow symbol 26, the idea symbol 30, the arrow symbol 26, and the recordation symbol 32. These ordered symbols are instructional indicia for the learner to form a group of two, then get the bin containing the pre-selected experiment materials for this set, then set up the experiment as depicted in the photographic images on the respective activity card, then conduct the experiment, making any modifications necessary (e.g., balancing the washers on the boat to prevent the boat from tipping before it sinks, etc.), and then record the results in their journal, respectively. The back side of the fourth activity sheet of the set includes the material symbol 38 and the card symbol 34 relevant to the fourth activity of the Sink or Float set. As they are used here, the symbols 38 and 34 are inventory indicia identifying the corresponding bin preloaded with the materials and the corresponding activity card, respectively, that are associated with the fourth activity of the Sink or Float set.

The Sink or Float set preferably includes a homework project for each learner to perform with an adult (e.g., a parent, guardian, etc.) outside the classroom setting. This homework project preferably includes providing the learner with materials that enable the learner to conduct simple experiments with whether objects will sink or float. The materials preferably include the book by Pamela Allen, "Who Sank the Boat?," PaperStar (1982). The project preferably includes having the learner conduct simple experiments predicting whether selected objects will sink or float (e.g., provide ten different blocks of varying densities and have the learner create a chart predicting which will sink and which will float and then put the blocks in a water-filled container and record the results next to the predictions, etc.). The project additionally preferably includes having the adult read and share the Allen book with the learner.

The activity set entitled Toolbox Creations preferably includes four activity sheets, each focused on learner exploration of various tools to build a variety of toy vehicles. Each of the activity sheets preferably includes an iconic identifier depicting the trunk of a child (including the head and arms) holding a driver and using a wrench to work on an object, and including another object and a toolbox in the foreground. Preferred objectives of Toolbox Creations include having the learners explore with model tools to construct various model vehicles using interconnectable toy building blocks. Additional expanded objectives include having the learners practice following simple directions to build an educational model vehicle using the building blocks and the tools and having the learners design and build anew model as a solution to a problem-solving activity. Another progressive objective involves having the learners practice recording solutions to problems by drawing and writing in their journals.

The first activity sheet of Toolbox Creations is directed to the first educational activity of the set and focuses groups of four learners on exploring with the interconnectable toy building blocks and tools that can be made into various model vehicles. The front side of the first activity sheet includes, in order, the crew symbol 22, the arrow symbol 26, the material symbol 38, the arrow symbol 26, the exploration symbol 28, the arrow symbol 26, and the idea symbol 30. These ordered symbols are instructional indicia for the learner to form a group of four, then get the bin containing the pre-selected building blocks and tools for this set, then explore and build with the blocks and tools, and then think of an idea related to what they built (e.g., how could you use what you built, when would you use it, what would you name it, etc.), respectively. The back side of the first activity sheet of the set includes the material symbol 38 relevant to the first activity of the Toolbox Creations set. As it is used here, the material symbol 38 is inventory indicia identifying the corresponding bin preloaded with the building blocks and tools corresponding to the Toolbox Creations set.

The second activity sheet of Toolbox Creations is directed to the second educational activity of the set and focuses groups of two learners on constructing an educational model vehicle using the building blocks, tools, and activity cards corresponding to the second activity of this set. The front side of the second activity sheet includes, in order, the team symbol 24, the arrow symbol 26, the material symbol 38, the arrow symbol 26, the card symbol 34, the arrow symbol 26, and the discussion symbol 40. These ordered symbols are instructional indicia for the learner to form a group of two, then get the bin containing the pre-selected building blocks and tools for this set, then build the educational model vehicle exactly as depicted in the photographic images on the respective activity card, then discuss the model they have built, and how they built it, with other learners (e.g., what would you name what you built, how would you use what you built, etc.), respectively. The back side of the second activity sheet of the set includes the material symbol 38 and the card symbol 34 relevant to the second activity of the Toolbox Creations set. As they are used here, the symbols 38 and 34 are inventory indicia identifying the corresponding bin preloaded with the building blocks and tools and the corresponding activity card, respectively, that are associated with the second activity of the Toolbox Creations set.

The third activity sheet of Toolbox Creations is directed to the third educational activity of the set and focuses groups of two learners on constructing educational model vehicles (e.g., a helicopter, a crane, etc.) using the building blocks, tools, and activity cards corresponding to the third activity of this set. The front side of the third activity sheet includes, in order, the team symbol 24, the arrow symbol 26, the material symbol 38, the arrow symbol 26, four of the card symbols 34, the arrow symbol 26, and the discussion symbol 40. These ordered symbols are instructional indicia for the learner to form a group of two, then get the bin containing the pre-selected building blocks and tools for this set, then build the educational models exactly as depicted in the photographic images on the respective activity cards, and then discuss the models they have built, and how they built them, with other learners (e.g., how are the two models different or the same, how would you use each of the models, etc.), respectively. The back side of the third activity sheet of the set includes the material symbol 38 and four of the card symbols 34 relevant to the third activity of the Toolbox Creations set. As they are used here, the symbols 38 and 34 are inventory indicia identifying the corresponding bin preloaded with the building blocks and tools and the corresponding activity cards, respectively, that are associated with the third activity of the Toolbox Creations set.

The fourth activity sheet of Toolbox Creations is directed to the fourth educational activity of the set and focuses groups of two learners on constructing educational models of various vehicles (e.g., a barge, a front loader, etc.) using the building blocks, tools, and activity cards corresponding to the fourth activity of this set. The front side of the fourth activity sheet includes, in order, the team symbol 24, the arrow symbol 26, the material symbol 38, the arrow symbol 26, four of the card symbols 34, the arrow symbol 26, and the recordation symbol 32. These ordered symbols are instructional indicia for the learner to form a group of two, then get the bin containing the pre-selected building blocks and tools for this set, then build the educational models exactly as depicted in the photographic images on the respective activity cards, and then record a drawing of their models in their journal, respectively. The back side of the fourth activity sheet of the set includes the material symbol 38 and four of the card symbols 34 relevant to the fourth activity of the Toolbox Creations set. As they are used here, the symbols 38 and 34 are inventory indicia identifying the corresponding bin preloaded with the building blocks and tools and the corresponding activity cards, respectively, that are associated with the fourth activity of the Toolbox Creations set.

The Toolbox Creations set preferably includes a homework project for each learner to perform with an adult (e.g., a parent, guardian, etc.) outside the classroom setting. This homework project preferably includes providing the learner with materials that enable the learner to explore with building structures (e.g., two-dimensional designs, three-dimensional designs, etc.). The materials preferably include interconnectable design building blocks (e.g., Zome 3, etc.) and the book by Gallimard Jeunesse & Claude Delafosse, "Tools," Scholastic (1999). The project preferably includes having the learner build common geometric shapes and designs using the design blocks. The project additionally preferably includes having the adult read and share the Jeunesse & Delafosse book with the learner.

The activity set entitled Magnets preferably includes four activity sheets, each focused on learner exploration of magnets, including magnetic attraction and repellence. Each of the activity sheets preferably includes an iconic identifier depicting the trunk of a child (including the head and the arms) holding a magnet. A preferred objective of Magnets includes having the learners explore with a variety of materials to discover what kinds of materials magnets attract. Additional expanded objectives include having the learners explore with a variety of materials to discover rules of polarity and having the learners use magnets to discover that a magnet's force can go through different materials. Another progressive objective involves having the learners use a magnetic force to hold things together.

The first activity sheet of Magnets is directed to the first educational activity of the set and focuses groups of two learners on exploring with a variety of magnets and materials to discover what kinds of materials magnets attract. The front side of the first activity sheet includes, in order, the team symbol 24, the arrow symbol 26, the material symbol 38, the arrow symbol 26, the exploration symbol 28, the arrow symbol 26, and the idea symbol 30. These ordered symbols are instructional indicia for the learner to form a group of two, then get the bin containing the pre-selected magnet materials for this set, then explore the materials, and then think of an idea related to what they discovered (e.g., which magnet is the strongest, do magnets push or pull, are any of the items not magnets, do magnets attract other magnets, all materials, etc.), respectively. The back side of the first activity sheet of the set includes the material symbol 38 relevant to the first activity of the Magnets set. As it is used here, the material symbol 38 is inventory indicia identifying the corresponding bin preloaded with the magnet materials corresponding to the Magnets set.

The second activity sheet of Magnets is directed to the second educational activity of the set and focuses groups of two learners on sorting various materials according to their magnetic properties. The front side of the second activity sheet includes, in order, the team symbol 24, the arrow symbol 26, the material symbol 38, the arrow symbol 26, the sort symbol 42, the discussion symbol 40, the arrow symbol 26, and the recordation symbol 32. These ordered symbols are instructional indicia for the learner to form a group of two, then get the bin containing the pre-selected materials for this set, then sort the materials, and discuss how the materials were sorted, with other learners, and then record whether the items were magnetic or nonmagnetic in their journal, respectively. The back side of the second activity sheet of the set includes the material symbol 38 relevant to the second activity of the Magnets set. As it is used here, the symbol 38 is inventory indicia identifying the corresponding bin preloaded with the materials that correspond to the second activity of the Magnets set.

The third activity sheet of Magnets is directed to the third educational activity of the set and focuses groups of two learners on conducting an experiment to discover and demonstrate the push and pull effects of magnets. The front side of the third activity sheet includes, in order, the team symbol 24, the arrow symbol 26, the material symbol 38, the arrow symbol 26, two of the card symbols 34, the arrow symbol 26, the discussion symbol 40, the arrow symbol 26, and the recordation symbol 32. These ordered symbols are instructional indicia for the learner to form a group of two, then get the bin containing the pre-selected experiment materials for this set, then conduct the experiment as depicted in the photographic images on the respective activity cards, then discuss the results (e.g., the push and pull effects of magnets) with other learners, and then record the results in their journal, respectively. The back side of the third activity sheet of the set includes the material symbol 38 and two of the card symbols 34 relevant to the third activity of the Magnets set. As they are used here, the symbols 38 and 34 are inventory indicia identifying the corresponding bin pre-loaded with the materials and the corresponding activity cards, respectively, that are associated with the third activity of the Magnets set.

The fourth activity sheet of Magnets is directed to the fourth educational activity of the set and focuses groups of four learners on creating a project involving magnets. The front side of the fourth activity sheet includes, in order, the crew symbol 22, the arrow symbol 26, the material symbol 38, the arrow symbol 26, two of the card symbols 34, the arrow symbol 26, and the project symbol 44. These ordered symbols are instructional indicia for the learner to form a group of four, then get the bin containing the pre-selected project materials for this set, then create the project depicted in the photographic images on the respective activity cards, then take the project home and show it to a parent or guardian, respectively. The project of this activity preferably includes the learners creating a fishing pole that "catches" magnetic fish (e.g., tying a string to a magnet, taping the string to a straw, and making paper fish with magnets taped to each one, etc.). The back side of the fourth activity sheet of the set includes the material symbol 38 and two of the card symbols 34 relevant to the fourth activity of the Magnets set. As they are used here, the symbols 38 and 34 are inventory indicia identifying the corresponding bin pre-loaded with the project materials and the corresponding activity cards, respectively, that are associated with the fourth activity of the Magnets set.

The Magnets set preferably includes a homework project for each learner to perform with an adult (e.g., a parent, guardian, etc.) outside the classroom setting. This homework project preferably includes providing the learner with materials that enable the learner to conduct simple experiments with magnets. The materials preferably include the book by Franklyn Branley, "What Makes a Magnet?," Harper Collins (1996). The project preferably includes having the learner conduct simple experiments with magnets, their attraction and repellence forces, and their poles (e.g., placing materials inside a plastic jar and passing a magnet along the outside of the jar, use a magnet to separate magnetic from nonmagnetic materials, place a pair of magnets end-to-end, "float" one magnet over another magnet, etc.). The project additionally preferably includes having the adult read and share the Branley book with the learner.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An educational method for educating a learner without requiring the learner to read textual instructions, said educational method comprising the steps of:
    (a) training the learner to associate each of a plurality of distinct pictorial symbols with a specific instruction;
    (b) after step (a), using a multiplicity of the pictorial symbols to instruct the learner to perform an educational activity; and
    (c) having the learner perform the educational activity, step (c) including the step of grouping the learner with at least one other learner so that the educational activity is performed jointly by the learners, step (c) including the step of having the learners play an educational game, wherein each learner competes against at least one other learner.

2. An educational method as claimed in claim 1, step (a) including the step of visually and verbally informing the learner what is to be performed in connection with each of the pictorial symbols.

3. An educational method as claimed in claim 2, step (a) including the step of presenting a prerecorded audio-visual program to the learner,
    wherein the program includes visual and verbal information on what is to be performed by the learner when encountering each of the pictorial symbols.

4. An educational method as claimed in claim 1, step (b) including the step of presenting the learner with a sheet that includes instructional indicia comprising said multiplicity of the pictorial symbols.

5. An educational method as claimed in claim 1; and (d) asking the learner questions regarding the educational activity.

6. An educational method as claimed in claim 5, performing step (d) while the educational activity is being performed.

7. An educational method as claimed in claim 1; and (d) having the learners jointly perform in seriatim multiple educational activities, step (b) including the step of presenting the learners with a plurality of sheets, each including indicia in the form of the multiplicity of the pictorial symbols arranged to instruct the learners to perform a corresponding one of the educational activities.

8. An educational method for educating a learner without requiring the learner to read textual instructions, said educational method comprising the steps of;
    (a) training the learner to associate each of a plurality of distinct pictorial symbols with a specific instruction;
    (b) after step (a), using a multiplicity of the pictorial symbols to instruct the learner to perform an educational activity; and
    (c) having the learner perform the educational activity, step (c) including the step of having the learner construct an educational model.

9. An educational method as claimed in claim 8; and (d) supplementing instruction provided by the multiplicity of the pictorial symbols with stepwise directions on how to construct and use the model.

10. An educational method as claimed in claim 9, step (d) including the step of providing the leaner with a series of photographic images depicting construction and use of the model.

11. An educational method as claimed in claim 10, step (c) including the step of having the learner use interconnectable toy building blocks in constructing the educational model.

12. An educational method as claimed in claim 8, step (c) including the step of having the learner play an educational game with the model.

13. An educational method as claimed in claim 12; and (c) supplementing instruction provided by the multiplicity of the pictorial symbols with a prerecorded audio-visual program that explains how the educational game is to be played.

14. An educational method as claimed in claim 8;
   (d) having the learner perform the educational activity in a classroom setting;
   (e) providing the learner with reading material that corresponds in educational content with the educational activity; and
   (f) having the learner review the reading material outside the classroom setting.

15. An educational method as claimed in claim 14, step (f) including the step of having someone other than the learner read the reading material to the learner.

16. An educational method as claimed in claim 15; and (f) having the learner perform additional educational activities outside the classroom setting, wherein the additional educational activities correspond in educational content with the first-mentioned educational activity.

17. A self-directed, activity based educational system for providing education to a learner without requiring the learner to read textual instructions, said educational system comprising:
   a plurality of distinct pictorial symbols;
   a training program adapted to train the learner to associate each of the plurality of distinct pictorial symbols with a specific instruction;
   a plurality of activity sheets that are each associated with a corresponding one of a plurality of distinct educational activities;
   each of said activity sheets including instructional indicia that comprises a multiplicity of the pictorial symbols arranged to instruct the learner to perform the corresponding educational activity;
   said activity sheets being arranged in sets so that the educational activities corresponding to each of the sets are related in educational content and preformed in seriatim; and
   a book related in educational content with the educational activities corresponding to one of the sets activity sheets.

18. A self-directed, activity based educational system for providing education to a learner without requiring the learner to read textual instructions, said educational system comprising:
   a plurality of distinct pictorial symbols;
   a training program adapted to train the learner to associate each of the plurality of distinct pictorial symbols with a specific instruction;
   a plurality of activity sheets that are each associated with a corresponding one of a plurality of distinct educational activities,
   each of said activity sheets including instructional indicia that comprises a multiplicity of the pictorial symbols arranged to instruct the learner to perform the corresponding educational activity; and
   each of said activity sheets presenting opposite front and back sides, with the instructional indicia being provided on the front side,
   each of said activity sheets including inventory indicia on the back side thereof, with the inventory indicia identifying what the learner needs to perform the corresponding educational activity.

19. An educational system as claimed in claim 18, each of said pictorial symbols representing a step to be performed in completing one of the educational activities.

20. An educational system as claimed in claim 18, said training program including a pre-recorded audio-visual program that includes visual and verbal information on what is to be performed by the learner when encountering each of the pictorial symbols.

21. An educational system as claimed in claim 18; and instructor material including textual information explaining and expanding upon the educational activity.

22. A self-directed, activity based educational system for providing education to a learner without requiring the learner to read textual instructions, said educational system comprising:
   a plurality of distinct pictorial symbols;
   a training program adapted to train the learner to associate each of the plurality of distinct pictorial symbols with a specific instruction;
   a plurality of activity sheets that are each associated with a corresponding one of a plurality of distinct educational activities,
   each of said activity sheets including instructional indicia that comprises a multiplicity of the pictorial symbols arranged to instruct the learner to perform the corresponding educational activity; and
   a plurality of activity mats each being configured so that the educational activities may be performed thereon.

23. An educational system as claimed in claim 22,
   each of said activity mats being generally rectangular in shape to present a pair of opposite short sides and a pair of opposite long sides that are relatively longer than the short sides,
   each of said mats including two-participant indicia adjacent each of the long sides in the form of two human characters,
   each of said mats further including four-participant indicia adjacent each of the short sides in the form of four human characters.

24. A self-directed, activity based educational system for providing education to a learner without requiring the learner to read textual instructions, said educational system comprising:
   a plurality of distinct pictorial symbols;
   a training program adapted to train the learner to associate each of the plurality of distinct pictorial symbols with a specific instruction;
   a plurality of activity sheets that are each associated with a corresponding one of a plurality of distinct educational activities,
   each of said activity sheets including instructional indicia that comprises a multiplicity of the pictorial symbols arranged to instruct the learner to perform the corresponding educational activity; and
   a plurality of interconnectable toy building blocks useable in performing at least one of the educational activities.

25. An educational system as claimed in claim 24; and modeling instructional material configured to provide instructions on how to build an educational model with the toy building blocks.

26. An educational system as claimed in claim 25, said modeling instructional material including an activity card that includes photographic indicia in the form of a series of photographic images depicting stepwise construction and use of the educational model.

27. An educational system as claimed in claim 25; and game instructional material configured to provide instructions on how to play an educational game with the model.

28. An educational system as claimed in claim 27, said game instructional material including a prerecorded audio-visual program that includes visual and verbal information explaining how the educational game is to be played.

* * * * *